United States Patent [19]
Kroll et al.

[11] Patent Number: 5,159,684
[45] Date of Patent: Oct. 27, 1992

[54] DATA COMMUNICATION INTERFACE INTEGRATED CIRCUIT WITH DATA-ECHOING AND NON-ECHOING COMMUNICATION MODES

[75] Inventors: Paul Kroll, New Milford; Eugene P. Gerety, Seymour; Earl B. Holtz, Shelton, all of Conn.

[73] Assignee: Pitney Bowes Inc., Stamford, Conn.

[21] Appl. No.: 356,973

[22] Filed: May 24, 1989

[51] Int. Cl.⁵ .............................................. G06F 11/00
[52] U.S. Cl. ............................... 395/500; 364/DIG. 1; 364/242.5; 364/239.9; 364/240.9; 371/34
[58] Field of Search ... 364/200 MS File, 900 MS File; 371/34; 340/825.04; 370/15

[56] References Cited

U.S. PATENT DOCUMENTS

| | | | |
|---|---|---|---|
| 3,228,000 | 1/1966 | Collis | 340/146.1 |
| 3,680,045 | 7/1972 | Meidan | 340/146.1 BA |
| 3,805,234 | 4/1974 | Masters | 340/146.1 BA |
| 4,070,648 | 1/1978 | Mergenthaler | 340/146.1 |
| 4,346,440 | 8/1982 | Kyu et al. | 364/200 |
| 4,347,608 | 8/1982 | Fukuyama et al. | 371/34 |
| 4,377,862 | 3/1983 | Koford et al. | 371/32 |
| 4,673,976 | 6/1987 | Wreford-Howard | 358/10 |
| 4,852,127 | 7/1989 | Fraser et al. | 375/94 |
| 5,051,899 | 9/1991 | Ikoma et al. | 371/34 |

FOREIGN PATENT DOCUMENTS 1236386  6/1971  United Kingdom ............ 371/34

OTHER PUBLICATIONS

Maiwald et al., "Error Recovery in Data Transmission", IBM Technical Disclosure Bulletin, vol. 13, No. 10, Mar. 1971.
Intel, MCS-8080/8085 Family User's Manual, 1986, pp. 6-49 to 6-65.

Primary Examiner—Thomas C. Lee
Assistant Examiner—Richard Lee Ellis
Attorney, Agent, or Firm—Robert H. Whisker; Melvin J. Scolnick

[57] ABSTRACT

An integrated circuit communication interface device includes data bus terminals, a serial output terminal, a serial input terminal, and an internal data bus. A data bus buffer connects the data bus terminals to the internal data bus. A transmit buffer connects the serial output terminal to the internal data bus. A receive buffer connects the serial input terminal to the internal data bus. Control circuitry controls the buffer so that the device receives or transmits data in either the Echoplex protocol or the RS 232 protocol. The device includes a data register which is programmed to select the device's mode of operation.

9 Claims, 32 Drawing Sheets

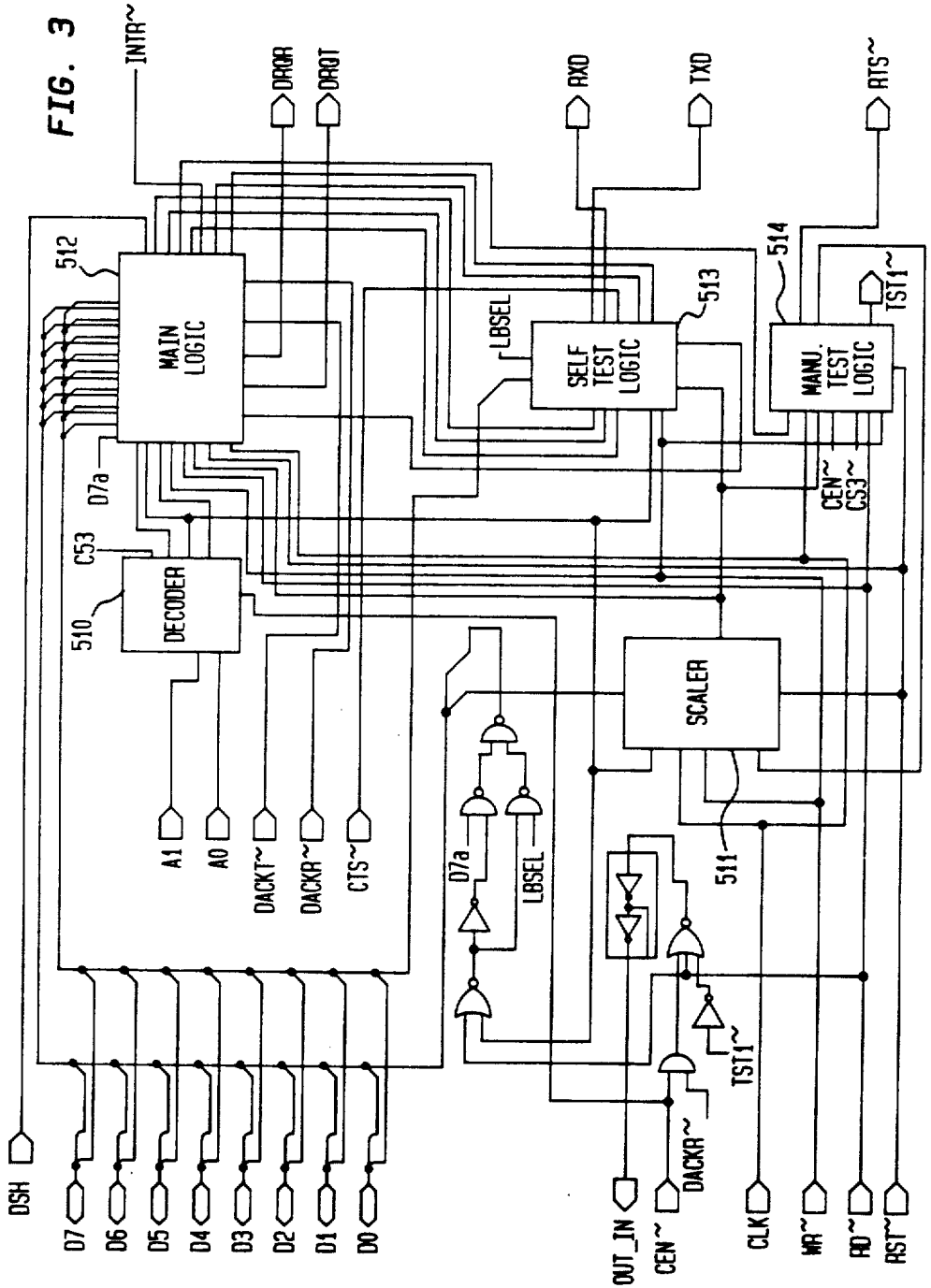

DATA COMMUNICATION INTERFACE INTEGRATED CIRCUIT WITH DATA-ECHOING AND NON-ECHOING COMMUNICATION MODES

BACKGROUND OF THE INVENTION

This invention is directed to the provision of an integrated circuit controller chip especially adapted for use in Echoplex communication, and that can be also employed in some RS232 communication.

Echoplex communication is discussed below, and also described in U.S. Pat. No. 4,535,421, Duwel et al, and U.S. Pat. No. 4,410,961, Dlugos et al. This communication protocol has been found to be of particular use in postage meter systems, although it is also useful for other communication.

Various techniques has been employed in the part for interfacing employing the Echoplex protocol. Thus, U.S. Pat. No. 4,535,421, Duwel et al, enables communication between a host computer and a postage meter employing a microprocessor with a control program, and a peripheral interface processor also having a control program. U.S. Pat. No. 4,395,756, Daniels; U.S. Pat. No. 4,410,961, Dlugos et al, and U.S. Pat. No. 4,410,962, Daniels et al disclose an interface system employing a microcomputer as well as hard wired logic. U.S. Pat. No. 4,642,791, Mallozzi et al discloses an interface to a weighing system, also employing a microcomputer.

SUMMARY OF THE INVENTION

The invention is directed specifically to the provision of an integrated circuit chip that will enable the simple and rapid interfacing of devices employing the Echoplex protocol, as well as providing limited communication by other techniques, such as RS232. The controller chip of the invention replaces the much more expensive circuits that are conventionally employed for this purpose. The chip is provided with internal registers that permit adapting the chip to the I/O devices employed by the user, in a simple manner.

The Controller Chip of the invention is a single channel serial receiver/transmitter designed for data communications using either the Echoplex Protocol or the Asynchronous Full Duplex RS-232. The chip is used as a peripheral device and is programmed by an 8 bit CPU to handle the two different data communication types.

The chip accepts data characters from the CPU in parallel format (8 bits) and then converts them into a continuous serial data stream for transmission. The chip also receives serial data streams and converts them into parallel data characters for the CPU. When using the Echoplex communication mode, the chip will handle all the necessary hand-shaking independent of the CPU. The CPU can read the complete status of the chip at any time. These include data transmission errors and control signals such as Transmit Buffer Empty or Receive Buffer Full.

The chip communicates with the CPU on a byte level through an 8 bit bidirectional data bus and separate read and write lines. There are two methods to handle data register transfers between the chip and the CPU and are software selectable by the CPU. They are, the DMA control mode where the data registers are handled by an external DMA controller and the Interrupt control mode where the data registers are handled by chip select and address and read or write strobes from the CPU. Status interrupts are available and are maskable.

Both the receiver and transmitter are double buffered, that is, one holding register and one working register.

The chip is preferably fabricated using 2 Micron Cmos Technology.

The chip can be used for Echoplex communication, as well as for certain RS-232 communication applications. It is restricted due to the fact that the word format and baud rate are fixed and cannot be reprogrammed. This chip can be used to communicate with some devices using the RS-232 interfaces.

BRIEF FIGURE DESCRIPTION

In order that the invention may be more clearly understood, it will now be disclosed in greater detail with reference to the accompanying drawings, wherein:

FIG. 3 is a more detailed block diagram of the logic circuits of the controller of FIG. 2;

Figure 11:
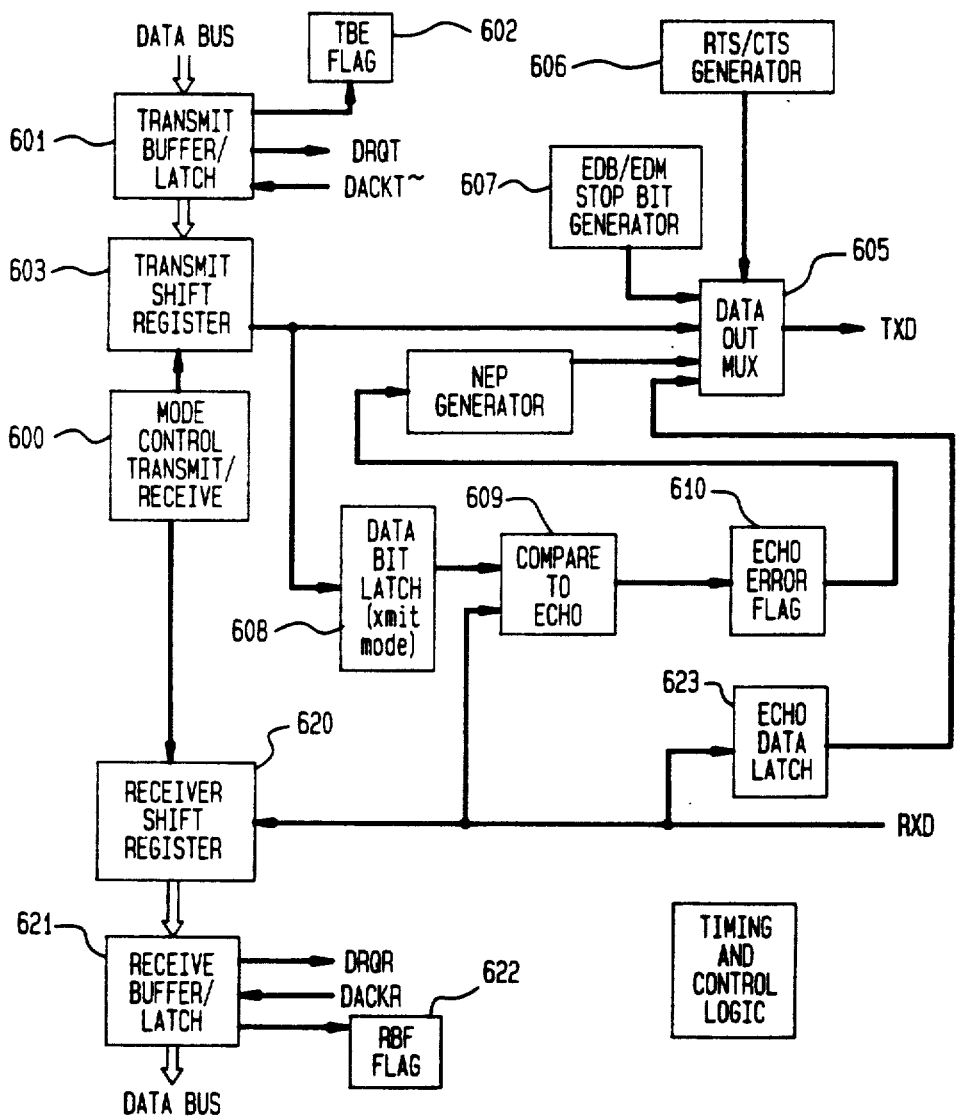
Figure 11A:
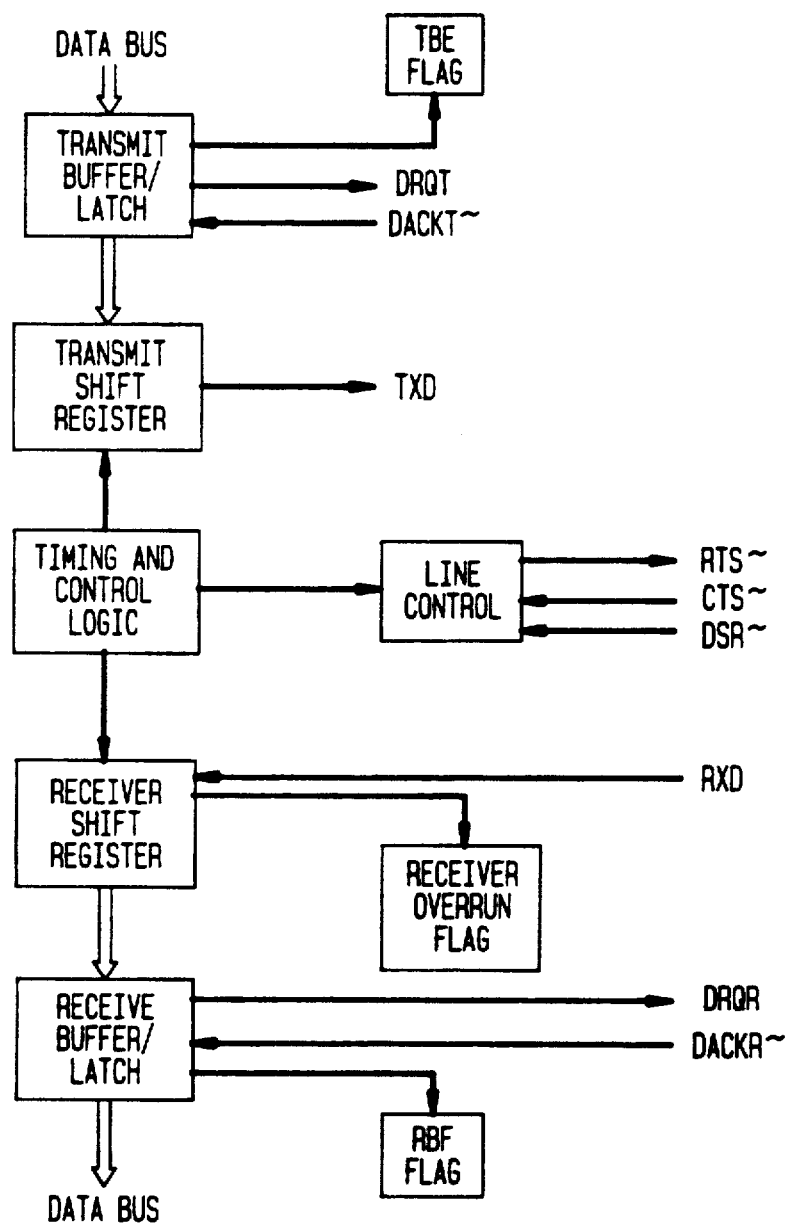

FIGS. 4, 5, 6, 7, 8, 9, and 10 are detailed schematic diagrams of selected portions of the circuit of FIG. 3;

FIG. 11 is a functional block diagram of the system of FIG. 3 in the Echoplex mode;

FIG. 11A of a functional block diagram of the system of FIG. 3 in the RS-232 mode;

FIGS. 12, 13, 14, 15, 16, 17, 18, 19, 20, 21, and 22 are further detailed schematic diagrams of selected portions of the circuit of FIG. 3.

Figure 23:
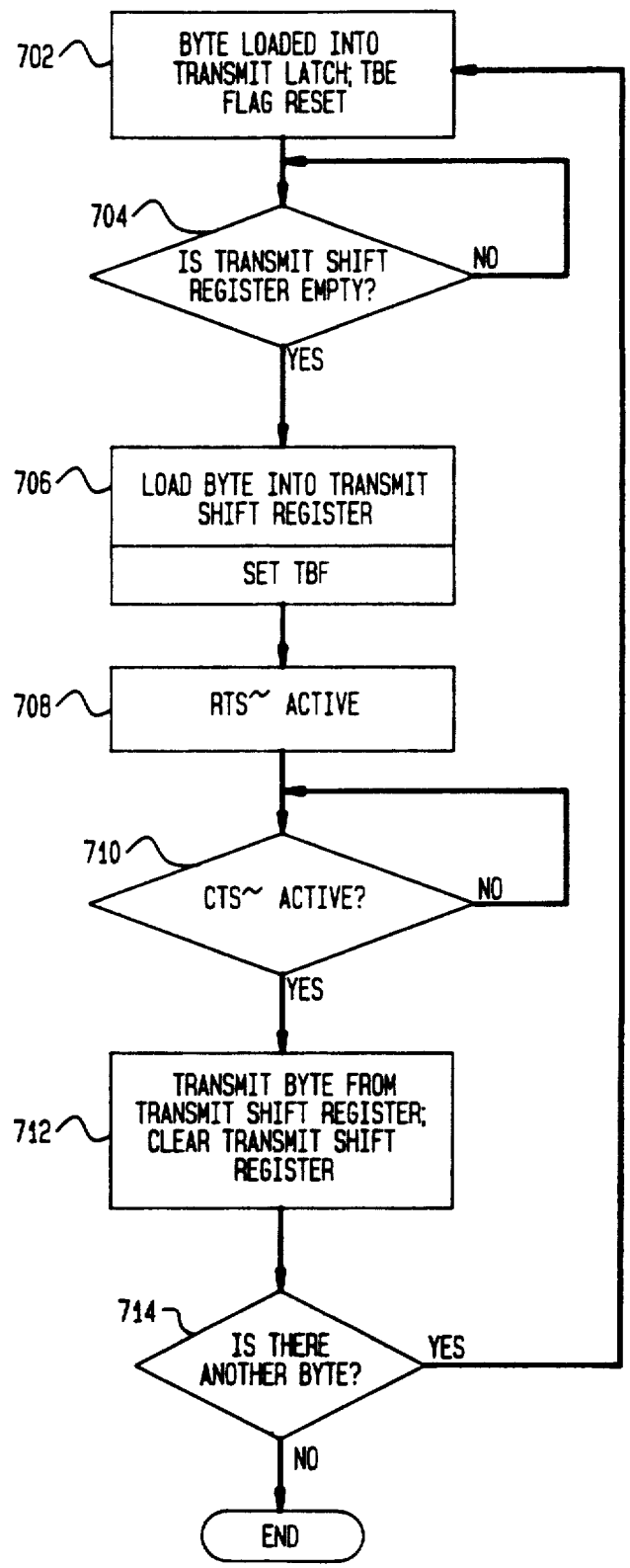

FIG. 23 is a flow diagram illustrating the RS-232 transmit mode.

Figure 24:
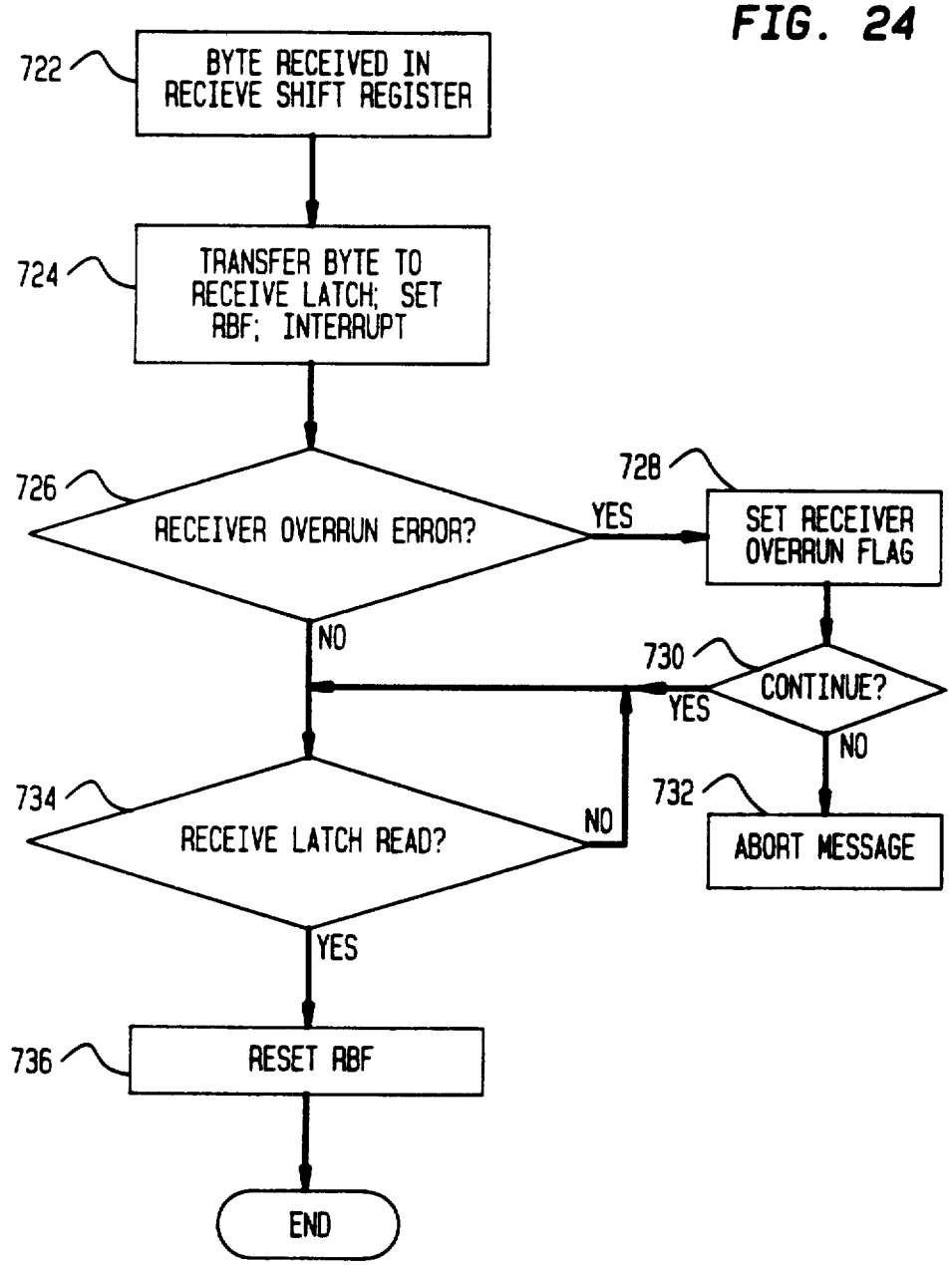

FIG. 24 is a flow diagram illustrating the RS-232 receive mode.

Figure 25:
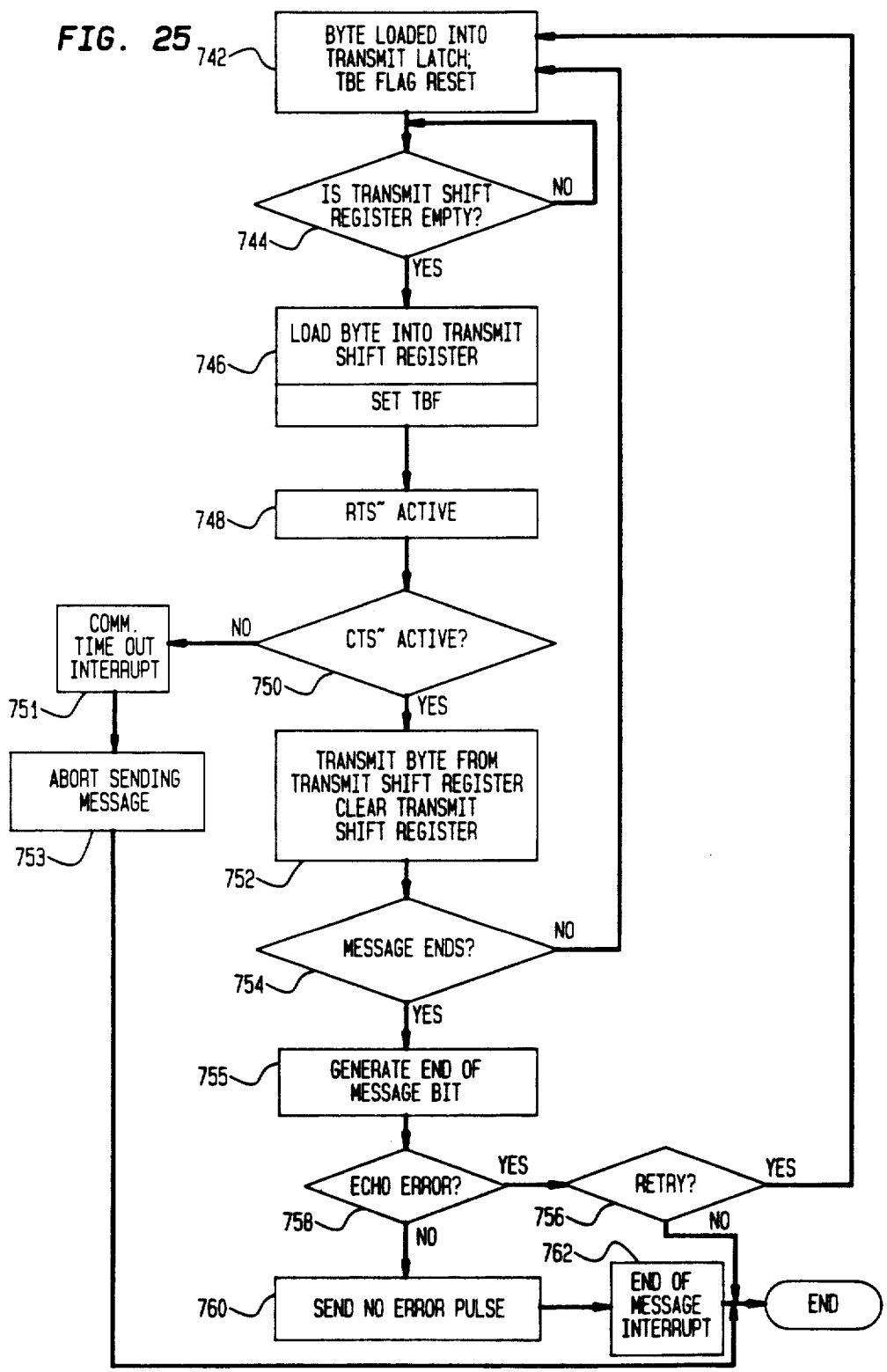
Figure 26:
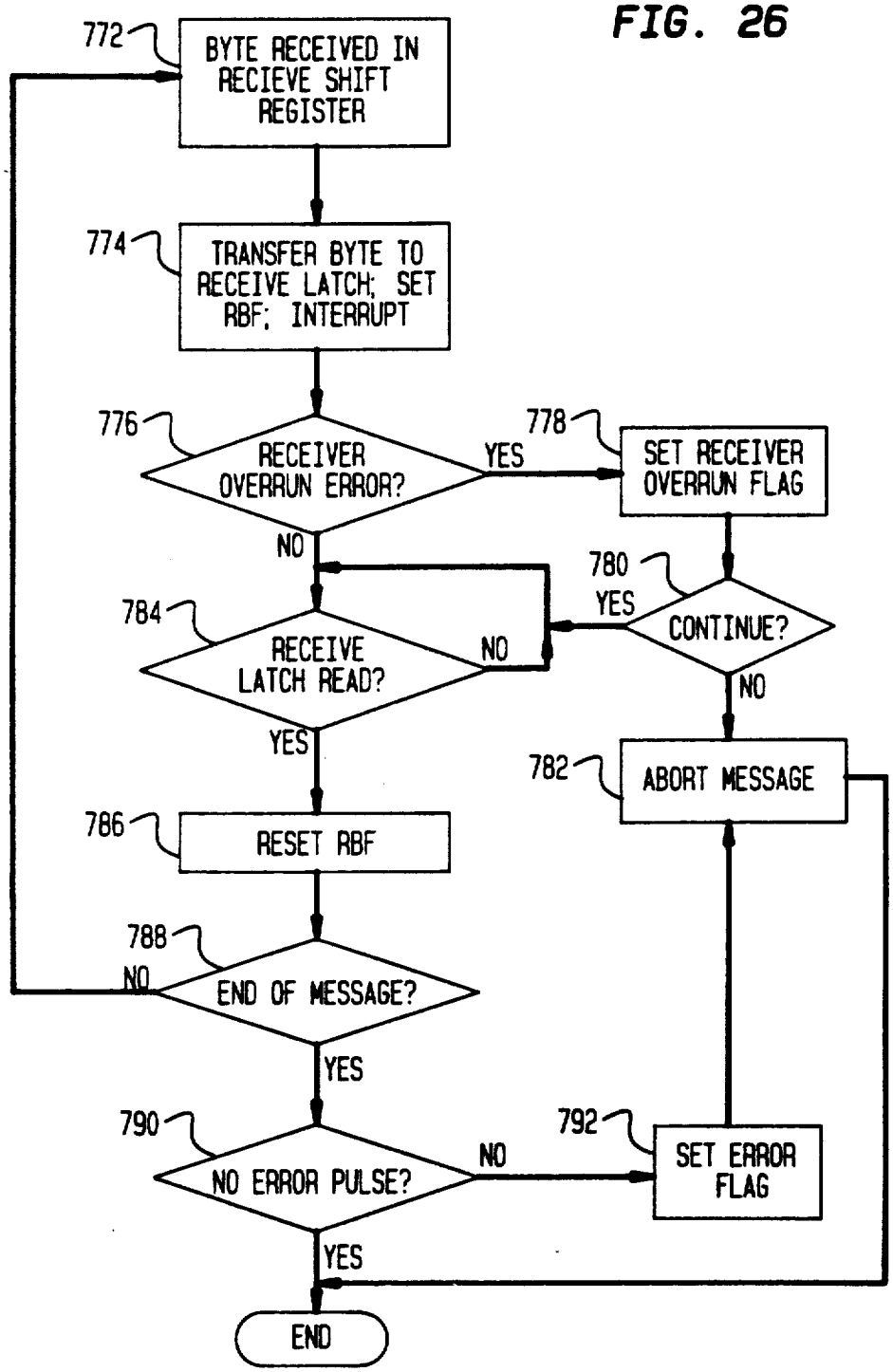
Figure 27:
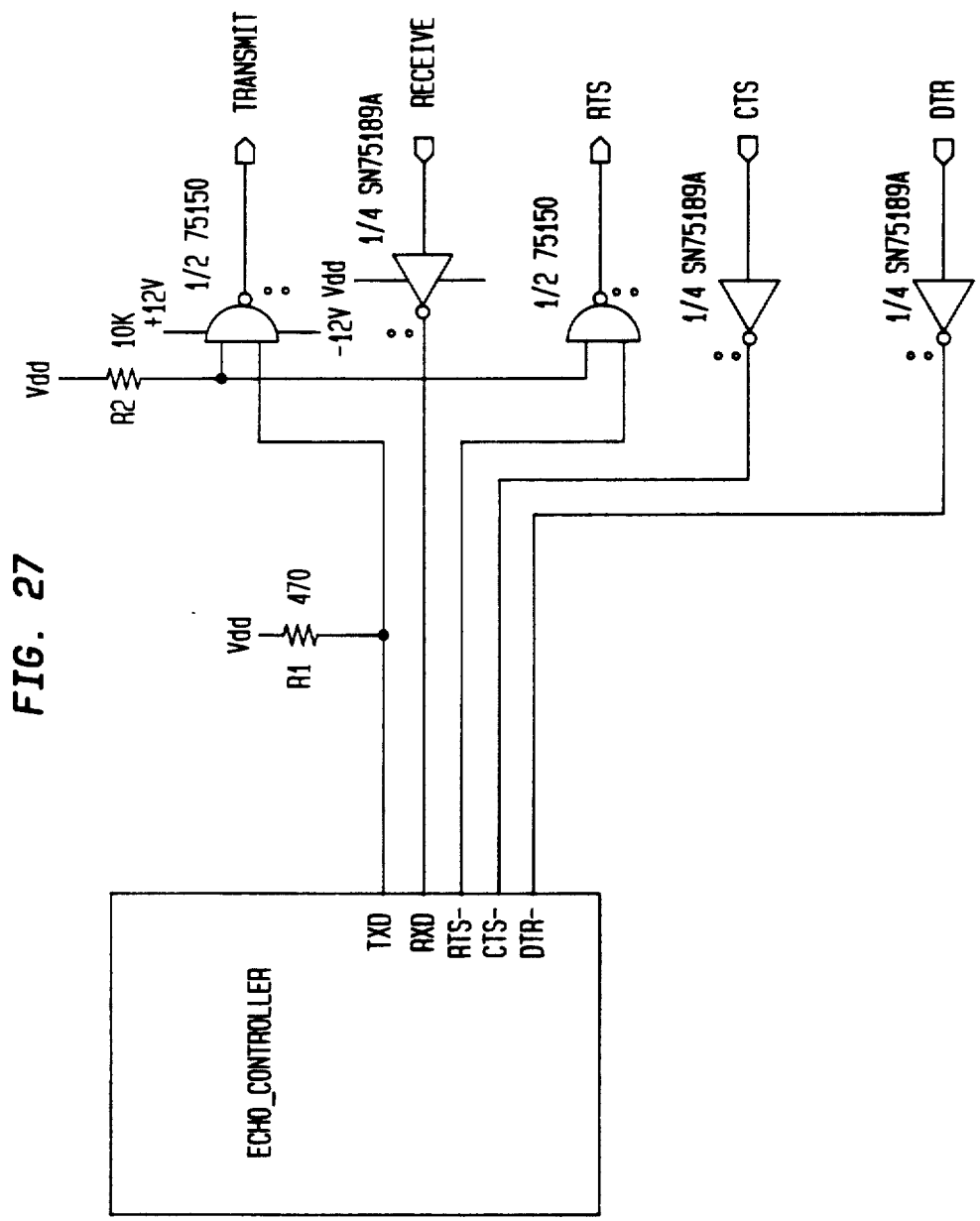
Figure 28:
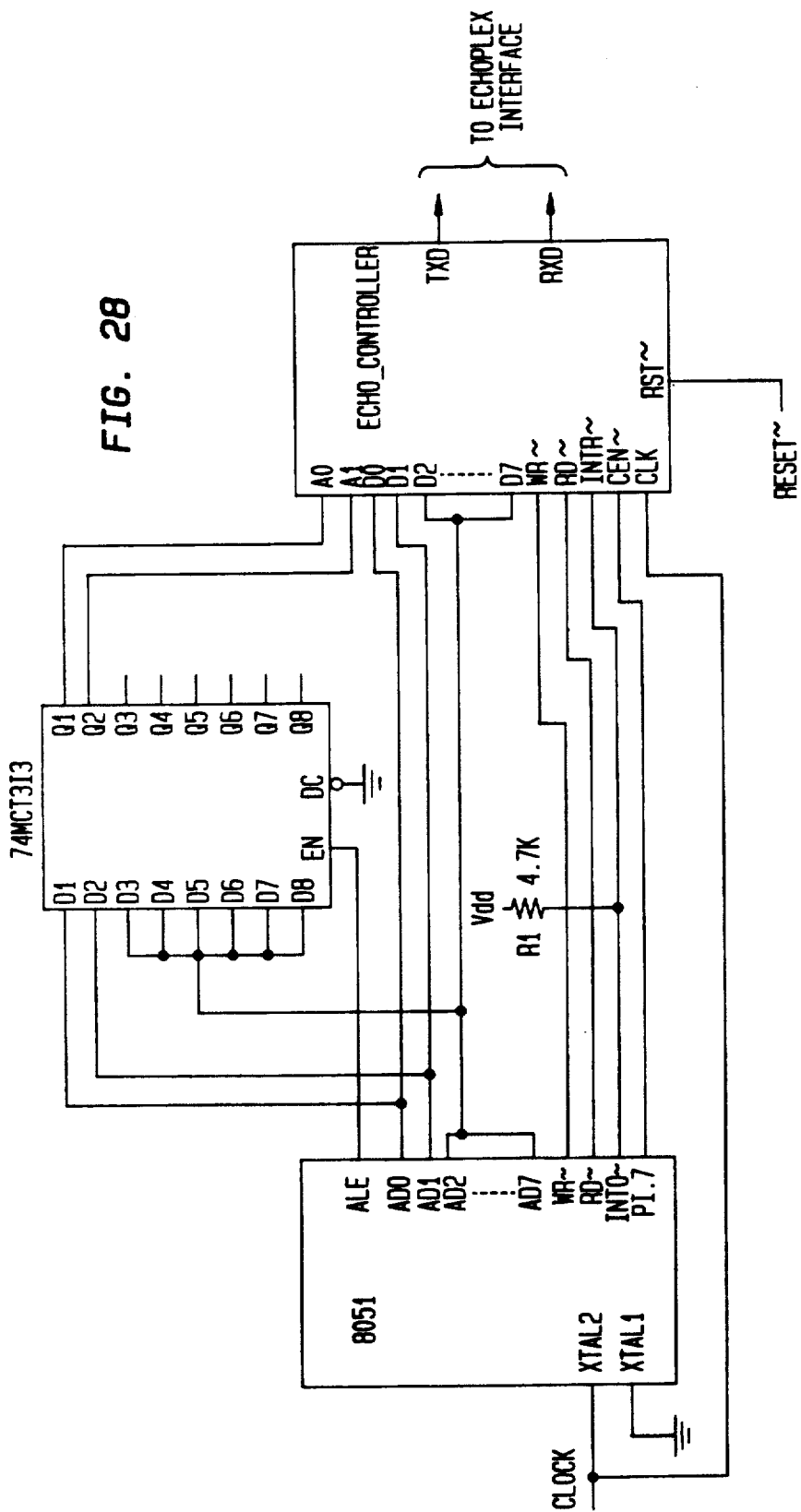
Figure 29:
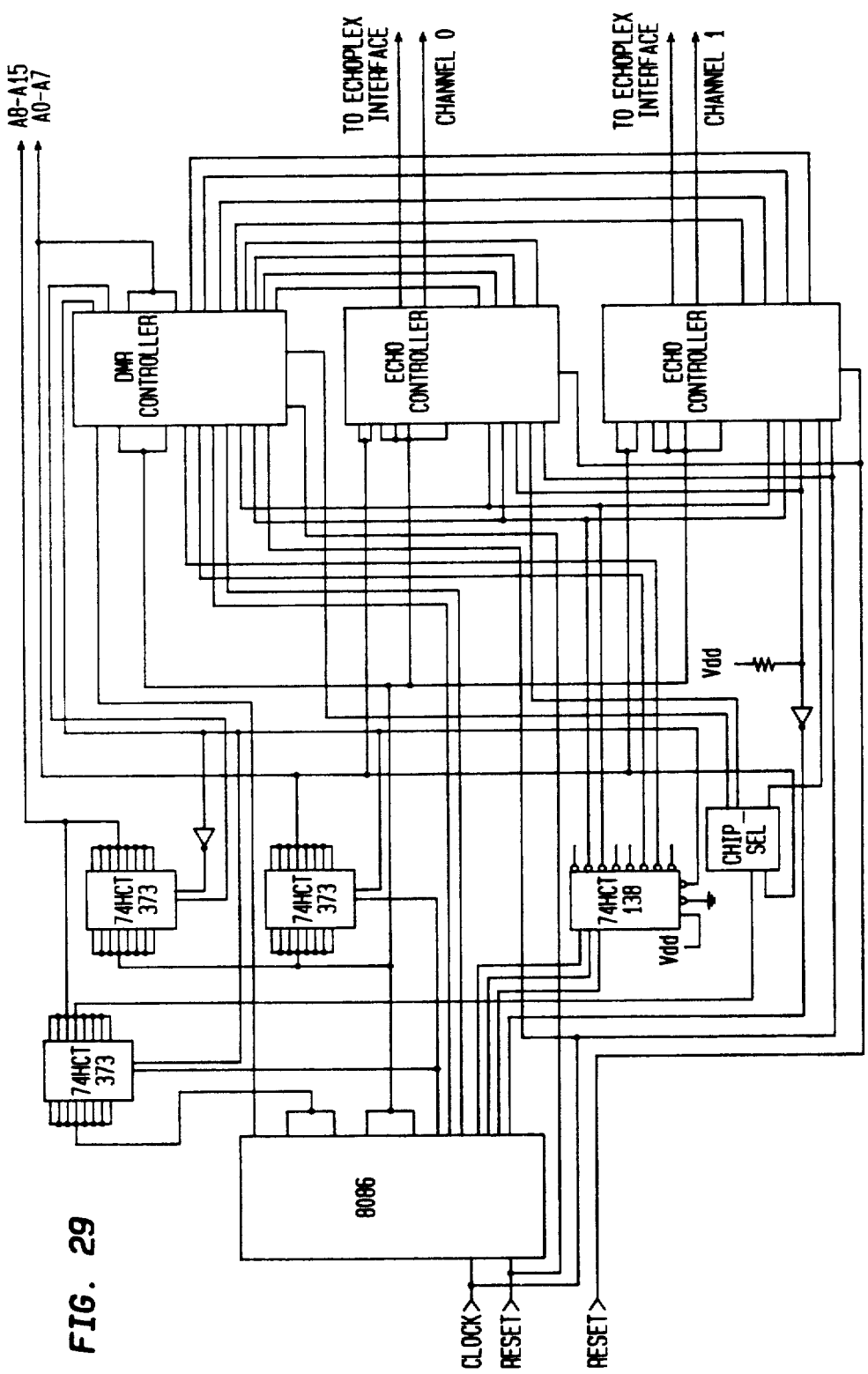
Figure 30:
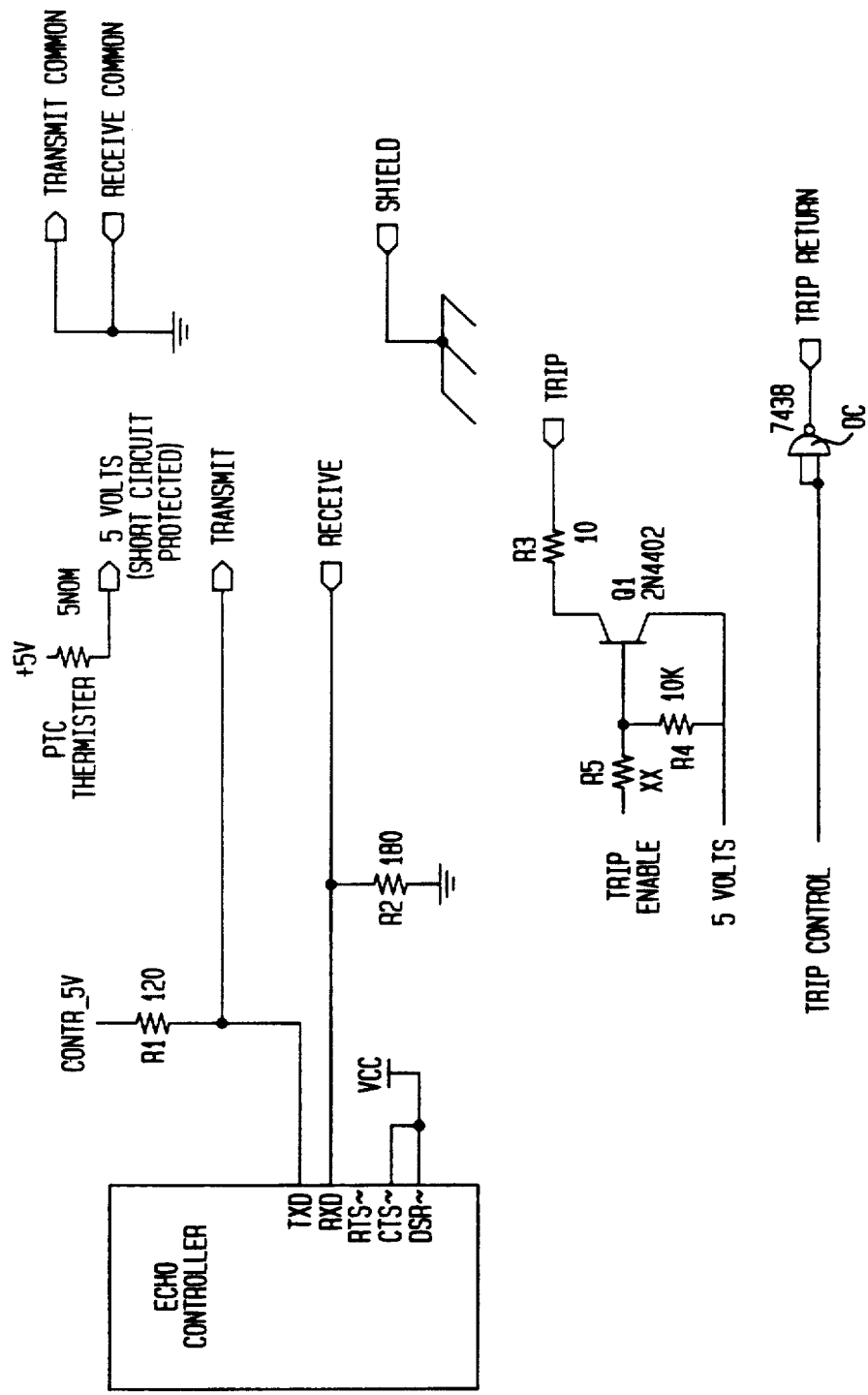

FIG. 25 is a flow digram illustrating the Echoplex Transmit mode;

FIG. 26 is a flow diagram illustrating the Echoplex Receive mode;

FIG. 27 is a schematic diagram illustrating an RS232 interface for the controller of the invention;

FIG. 28 is a schematic diagram illustrating the connections of the controller of the invention in the interrupt mode;

FIG. 29 is a schematic diagram illustrating the connections of the controller of the invention in the DMA mode; and FIG. 30 is a circuit diagram illustrating the connections of the controller of the invention in the Echoplex mode.

DETAILED DISCLOSURE OF THE INVENTION

Echoplex communication is particularly suitable for communication to devices in which security must be maintained. An example of such a device is a postage meter. In providing secure communication, it is imperative that electromagnetic radiation and susceptibility be kept to a minimum. This requirement, in turn, is best satisfied by minimizing the number of electrical conductors which the communication link depends on to effect data communication. Thus, serial communication is an attractive approach.

Echoplex transmission is a special serial communication scheme which provides error free transmission. In providing secure communication, the data transmission must be error free, and it is also desirable to control the communication as much as possible through software rather than hardware. Further, it is desirable that such communication be fast, so that the individual computer processors which are communicating do not become input/output bound. Echoplex communication satisfies each of these requirements.

In implementing Echoplex communication, two one-way ("simplex") circuits are used with the ability to present either a low logic level (0 volts) or a high logic level (5 volts) on each circuit. One simplex circuit is used for the transmission of data from a device, and the other is used for reception of information by the device.

Figure 1:
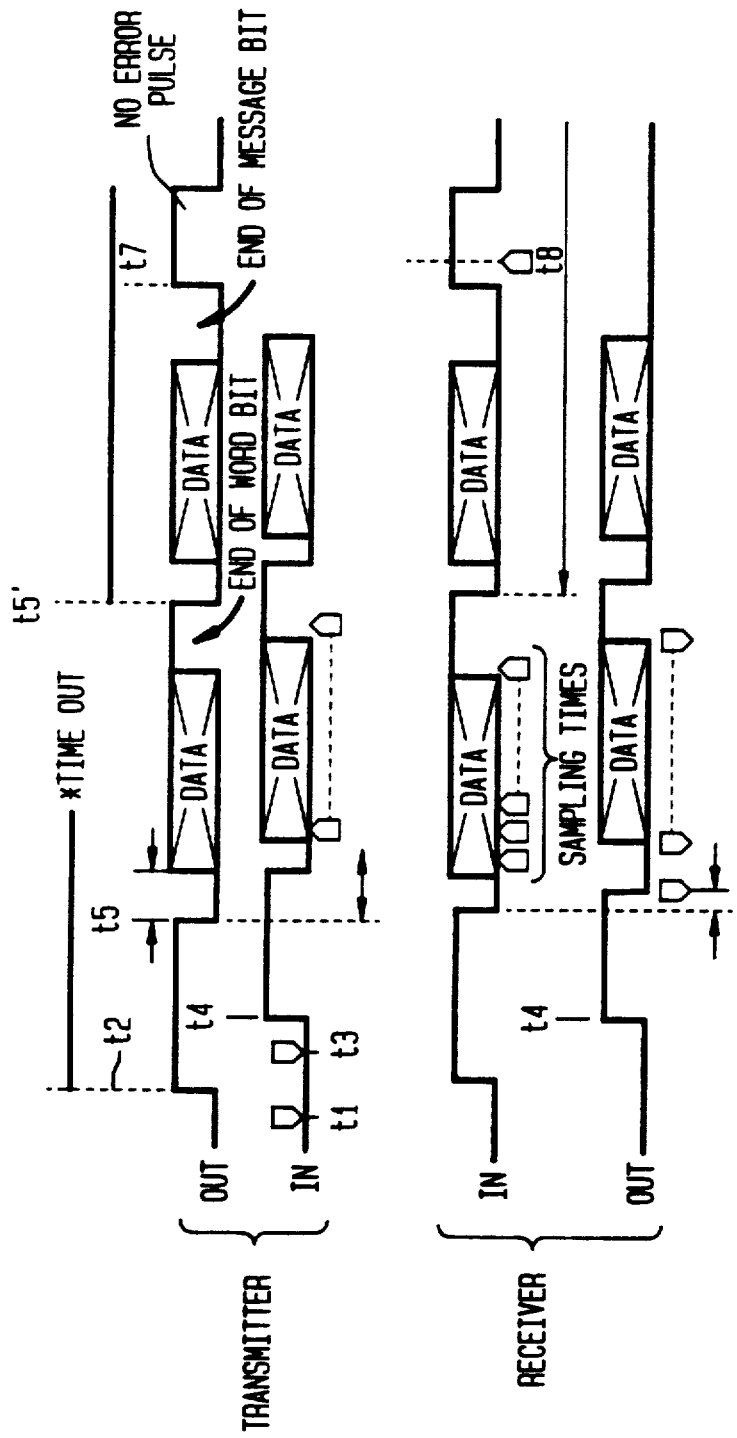
FIG. 1 is a timing diagram for explaining Echoplex communication.

In Echoplex transmission, as illustrated in FIG. 1, data is communicated between units on a message basis, serially over the first simplex circuit, and by echoing back (hence Echoplex) the transmitted signal over the second simplex circuit on a bit-by-bit basis. A comparison is made at the transmitter to determine, in real time, if the signal sent by the transmitter is the same as the signal received by transmitter. If the signals are the same, the transmitter sends a no-error pulse to the receiver. Data transfer rate is slowed only by the time required for the no-error pulse.

Echoplex communication is serial, bit synchronous, word asynchronous, start/stop communication, for example at 9600 baud. The communication is solely on the basis of messages, i.e., separate control lines are not provided between the communicating units for control of the communications. Each byte is 10 bits, beginning with a start bit followed by an 8 bit word, or byte, and concluding with a stop bit. The last stop bit of a message has a sense opposite to that of all other stop bits of the message, in order to indicate the end of the message. A logical zero is indicative of a start bit, an end of message stop bit, and typically is a zero data bit. A logical one can represent a request to send, a clear to send, an end of byte stop bit, a one data bit, and also the presence of a no-error pulse, which typically is a high.

If the messages have more than one word, the second word of the message may contain a format byte, consisting of two nibbles, i.e., four-bit groups. The first nibble tells the number of nibbles of data in the message, and the second nibble gives the number of digits to the right of the decimal point of the data, or corresponds to a hexadecimal F is there is no explicit decimal point.

When a message is ready to be sent by a unit, the receive line of the unit is first tested. If it is low then the transmitting device raises its send line to a high, and again tests the receive line. If it is still low, the unit is free to transmit, otherwise, it must become a receiver. This avoids contention between two units.

The timing of the messages constitutes the crux of the communication system whereby the messages may be asynchronous. Typical timing is illustrated in FIG. 1, which illustrates the relative timing of the lines of the transmitter for sending a given message, and the lines of a receiver for receiving the same message. Since the transmitter output line is the same as the receiver input line, it will be evident that these two signal lines are identical. The same is true, of course, with respect to the transmitter input line and the receiver output line.

In a successful transmission system of this type, the transmitter tests its input line at time $t_1$ and, if a low is detected, raises its output line to a high within 50 microseconds, as shown at $t_2$. The transmitter then again tests its input line at time $t_3$ within 50–100 microseconds. If the input line is still at a low then the transmitter can start to send its message at time $t_5$ following a minimum wait of 170 microseconds, by the lowering of this output line to form the start bit of the message. In the meantime, at time $t_4$, the receiver has raised its output line to a high level in a minimum of 100 microseconds indicating it is ready to receive data. This indicates a "clear to send" condition. The timing between the succeeding bytes of a multibyte message, as indicated by the time interval between $t_5$ and $t_{5'}$, is 1134.375 microseconds minimum, in order to insure that the receiver has been enabled to effect proper reception and storage of the signals.

The time from the beginning $t_5$, of the last message byte and the transmission of a no-error pulse at time $t_7$ is set at 1031.26 to 1157.291 microseconds, and the no-error pulse has a width from 309.375 microseconds to 368.228 microseconds. The receiver must test for the occurrence of a no-error pulse at time $t_8$ from 1187.291 to 1340.625 microseconds following the initiation of the start pulse of the last byte of the message. The transmitter bit transitions must be in accordance with Table 1, below, and the receiver sampling of the data and stop bits must be in accordance with the timing illustrated in Table II.

TABLE 1

| n | BIT | MINIMUM | MAXIMUM |
|---|-----|---------|---------|
| 1 | START | 0 | 0 |
| 2 | DATA 1 | 103.125 | 105.208 |
| 3 | DATA 2 | 206.25 | 210.417 |
| 4 | DATA 3 | 309.375 | 315.625 |
| 5 | DATA 4 | 412.500 | 420.833 |
| 6 | DATA 5 | 515.625 | 526.042 |
| 7 | DATA 6 | 618.750 | 631.250 |
| 8 | DATA 7 | 721.875 | 736.458 |
| 9 | DATA 8 | 825.000 | 841.667 |
| 10 | STOP | 928.125 | 946.875 |

TABLE II

| n | BIT | MINIMUM |
|---|-----|---------|
| 1 | START | — |
| 2 | D1 | 115.208 |
| 3 | D2 | 220.416 |
| 4 | D3 | 325.624 |
| 5 | D4 | 430.832 |
| 6 | D5 | 536.040 |
| 7 | D6 | 641.248 |
| 8 | D7 | 746.456 |
| 9 | D8 | 851.664 |
| 10 | STOP | 956.872 |

With the above timing, asynchronous transmission is thereby feasible so that control leads for this purpose between the units are unnecessary.

Further, in order to insure that the information is correctly received by the receiver without error, the data is sequentially returned to the transmitter on the receiver output line. The times for the retransmission of the data, from the beginning of the instruction loop detecting a start bit, are given in table III, and the times for sampling this data on the input line to the transmitter are given in table IV.

If, and only if, the received data at the transmitter is the same as the sent data, will the no-error pulse be transmitted at the end of the message.

As a further control over the message communication, the transmitter will wait for a minimum 3.5 millisecond for a clear to send signal from the receiver after presenting a request to send transmission, and similarly, the receiver will wait for about 3.5 milliseconds maximum for the start of a message after presenting the clear to send message. Contention between units is further minimized by setting determined periods that must be existent between adjacent transmitter activity of a unit, as well as between adjacent receivers.

TABLE III

| n  | BIT   | MINIMUM | MAXIMUM  |
|----|-------|---------|----------|
| 1  | START | 32.083  | 73.125   |
| 2  | D1    | 137.292 | 176.250  |
| 3  | D2    | 242.500 | 279.375  |
| 4  | D3    | 347.708 | 382.500  |
| 5  | D4    | 452.917 | 485.625  |
| 6  | D5    | 558.125 | 588.75   |
| 7  | D6    | 663.333 | 691.875  |
| 8  | D7    | 768.542 | 795.000  |
| 9  | D8    | 873.750 | 898.125  |
| 10 | STOP  | 978.958 | 1001.250 |

TABLE V

| n  | BIT   | MINIMUM  | MAXIMUM  |
|----|-------|----------|----------|
| 1  | START | 103.125  | 135.208  |
| 2  | D1    | 206.250  | 240.416  |
| 3  | D2    | 309.375  | 345.625  |
| 4  | D3    | 412.500  | 450.833  |
| 5  | D4    | 515.625  | 556.041  |
| 6  | D5    | 618.750  | 661.250  |
| 7  | D6    | 721.875  | 766.458  |
| 8  | D7    | 825.000  | 871.667  |
| 9  | D8    | 928.125  | 976.875  |
| 10 | STOP  | 1031.250 | 1082.083 |

The controller of the invention is a single channel serial receiver/transmitter, fabricated on a single integrated circuit chip, and designed for data communications using either the Echoplex protocol, as defined in U.S. Pat. No. 4,301,507, or Asynchronous Full Duplex RS-232. The chip is used as a peripheral device and can be programmed by a host CPU to handle either of the two different data communication protocols.

The controller accepts data characters from the host CPU in parallel format (8 bits) and then converts then into a continuous serial data stream for transmission. The chip can also receive serial data streams and convert them into parallel data characters for the CPU. When using the Echoplex communication mode, the chip will handle all the necessary handshaking independently of the CPU. The CPU can read the complete status of the chip at any time. These include the transmission errors and control signals such as Transmit Buffer Empty or Receive Buffer Full.

The controller communicates with the CPU on a byte level through an 8 bit bidirectional data bus and separate read and write lines. There are two methods to handle data register transfers between the chip and the CPU and these methods are software selectable by the CPU. They are, the DMA control mode in which the data registers of the controller are handled by an external DMA controller and the Interrupt control mode in which the data registers of the controller are handled by chip select, address and read or write strobes from the CPU. Status interrupts are available and are maskable.

Both the receiver and transmitter are double buffered, that is, each are provided with a holding register and a working register.

When the controller is used for certain RS-232 communication applications, it is restricted due to the fact that the word format and baud rate are fixed and cannot be reprogrammed. This controller can thus be used to communicate with some dedicated equipment using the RS-232 interface. However, when communicating with other RS-232 devices the traditional UART (Universal Asynchronous Receiver Transmitter) should be used such as Intel's 8251A Programmable Communications Interface.

Figure 2:
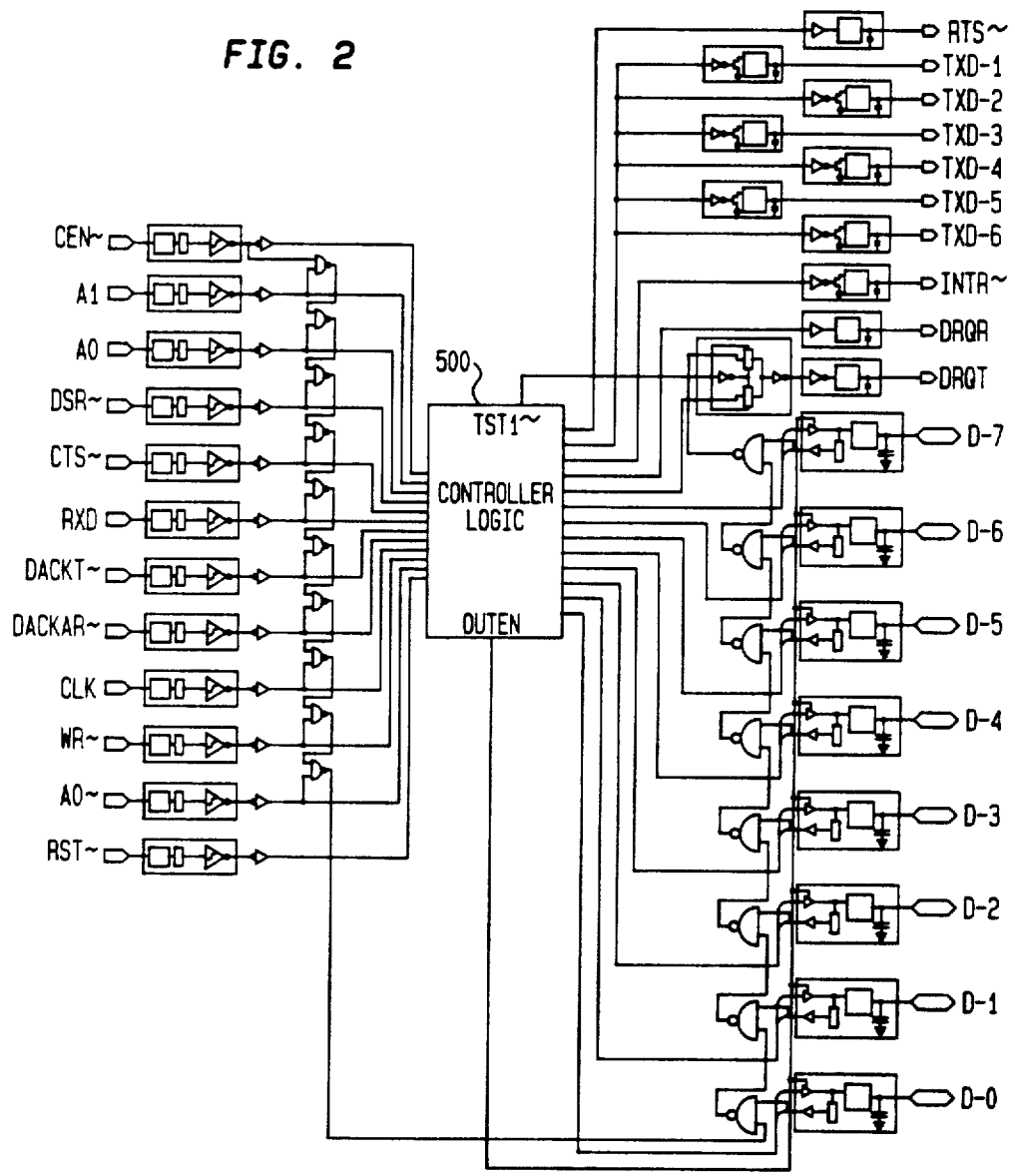
FIG. 2 is a block diagram of a controller in accordance with the invention.

FIG. 2 is a block diagram of a controller in accordance with the invention, showing the logic block 500 of the controller, and the input and output drivers coupled thereto. All inputs are Schmitt Trigger devices. The data inputs and outputs are bi-directional devices. The interrupt (INTR) and transmit data (TXD) outputs are open drain devices. The remaining outputs are normal TTL compatible devices. All the 2-input NAND gates connected in a serial stream to develop the NAND TREE OUT signal are used to test the integrity of the input devices during manufacturing test. The functional block 500 contains the remaining logic of the controller.

The pins of the illustration in FIG. 2 are described as follows:

| MNEMONIC | TYPE | NAME AND FUNCTION |
|----------|------|-------------------|
| D0-D7    | I/O  | DATA BUS: Active high 8 bit bidirectional tri-state data bus. Bit 0 is the lsb and bit 7 is the msb. All data, command and status transfers between the host CPU and the Echoplex controller chip take place over this bus. The direction of the transfer is controlled by the RD~ and WR~ inputs when the CEN~ input is low. When the CEN~ input is high, the data bus is in the tri-state mode. |
| CEN~     | I    | CHIP ENABLE: Active low input. When low, data transfers between the host CPU and the Echoplex Controller chip are enabled on D0-D7 and controlled by the RD~, WR~, and A0-A1 inputs. When CEN~ is high, the Echoplex Controller chip is effectively isolated from the data bus and D0-D7 are placed in the tri-state mode. |
| RD~      | I    | READ STROBE: Active low input. A low on this pin while CEN is low causes the contents of the register selected by A0-A1 to be placed on the data bus. Data will be stable at the trail edge (low to high transition) of the pulse. |
| WR~      | I    | WRITE STROBE: Active low input. A low on this pin while CEN~ is low causes the contents of the data bus to be transferred to the register selected by A0-A1. The transfer occurs on the trailing edge (low to high transition) of the pulse. |
| A0-A1    | I    | ADDRESS LINES: Active high address inputs to select the Echoplex Controller chip registers for read/write operations. |
| RST~     | I    | RESET: Master Reset. A low on this pin clears the register controlled Reset mode, places the chip in Echoplex Non-Priority mode, clears the Self Test mode to normal operation, places the chip in DMA data handling mode, clears the TBE and RBF flags, clears all Interrupt flags, clears the Interrupt Enable register, places the receiver and transmitter in the idle state causing the TXD output to go low, and sets the chip to accept the |

| MNEMONIC | TYPE | NAME AND FUNCTION |
|---|---|---|
| INTR~ | O | 5.76 MHZ input clock frequency. INTERRUPT REQUEST: This output goes low upon occurrence of one or more of the interrupting conditions. The host CPU can read the interrupt status register (and the general status register if in data interrupt mode) to determine the interrupting conditions(s). Open Drain output. |
| CLK | I | CLOCK INPUT: Input for the external clock which will establish the time base for all internal timing and counting operations. |
| RXD | I | RECEIVER SERIAL DATA INPUT: The least significant bit is received first. |
| TXD | O | TRANSMITTER SERIAL DATA OUTPUT: The least significant bit is transmitted first. This output is held low in Echoplex mode or high in RS-232 (UART) mode when the transmitter is idle or operating in self test mode. Open Drain output. |
| RTS~ | O | REQUEST TO SEND: This output goes low as soon as the transmit buffer is loaded and goes high as soon as the last bit of a byte is transmitted. It is active as long as the transmitter is busy. |
| CTS~ | I | CLEAR TO SEND: Active low input. When the transmitter lowers its RTS~ line, it will suspend transmit operation indefinitely (no time out) until it receives an active low on the CTS line. This function is only available in the RS-232 (UART) mode. Tie up to Vdd if not used. |
| DSR~ | I | DATA SET READY: Active low. This input can be polled in order to detect if a receive only external device is active. Tie to Vdd if not used. |
| DRQR | O | DMA REQUEST RECEIVER: This output goes high when the receive buffer is full and goes low on the lead edge (high to low transition) of the DACKR~ input signal from a DMA controller. Can also be used as an interrupt line to signal the CPU that the receive buffer is full. |
| DACKR~ | I | DMA ACKNOWLEDGE RECEIVER: Active low input that causes the contents of the receive buffer to be placed on the data bus. The DRQR output will be cleared on the lead edge (high to low transition) and data on the data bus will be stable at the trail edge. CEN does not have to be active for this operation. Tie to Vdd if not used. |
| DRQT | O | DMA REQUEST TRANSMITTER: This output goes high when the transmit buffer is empty and goes low on the lead edge (high to low transition) of the DACKT~ input signal from a DMA controller. Can also be used as an interrupt line to signal the CPU that the transmit buffer is empty. |
| DACKT~ | I | DMA ACKNOWLEDGE TRANSMITTER: Active low input that causes the contents of the data bus to be transferred to the transmit buffer. The DRQT output will be cleared on the lead edge (high to low transition) and data on the data bus must be stable at the trail edge. CEN~ does not have to be active for this operation. Tie to Vdd if not used. |
| Vdd | I | POWER SUPPLY: +5V Supply |
| Vss | I | GROUND |

Figure 2A:
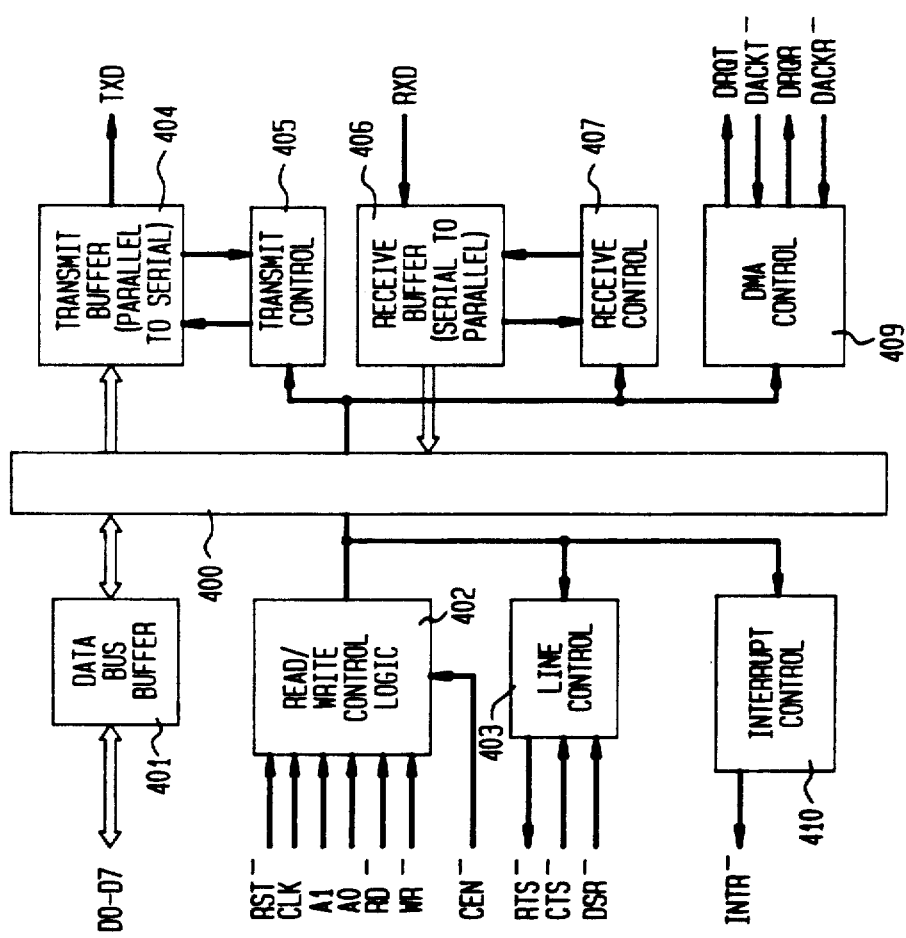
FIG. 2A is a functional block diagram of the controller of the invention.
Figure 4:
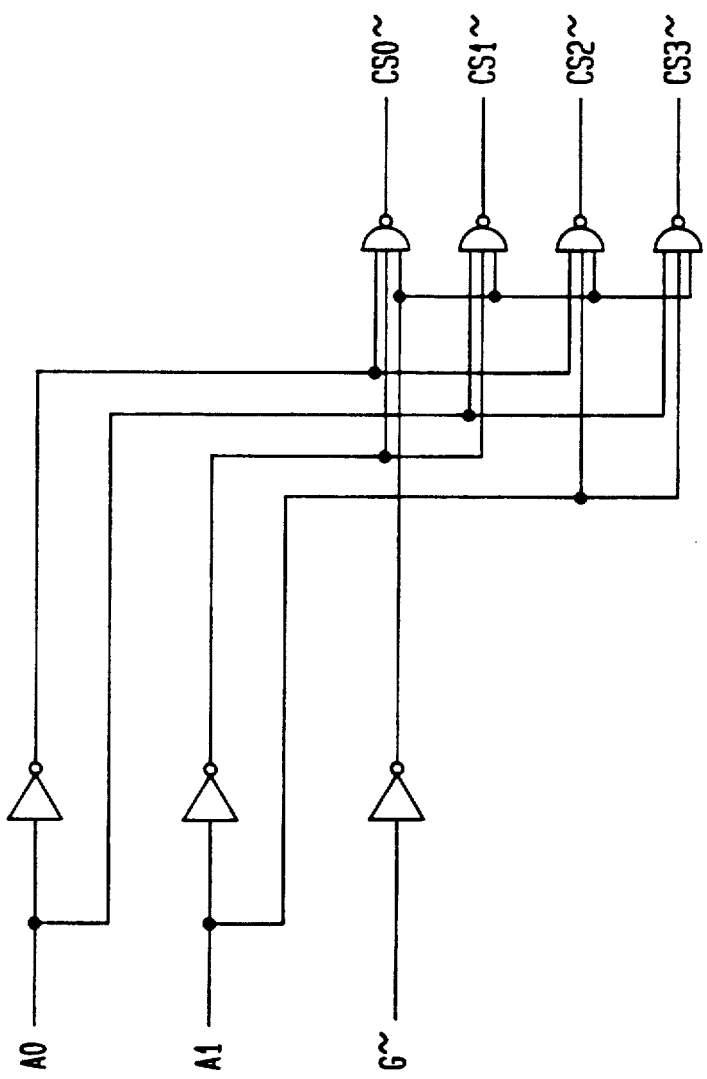
Figure 5:
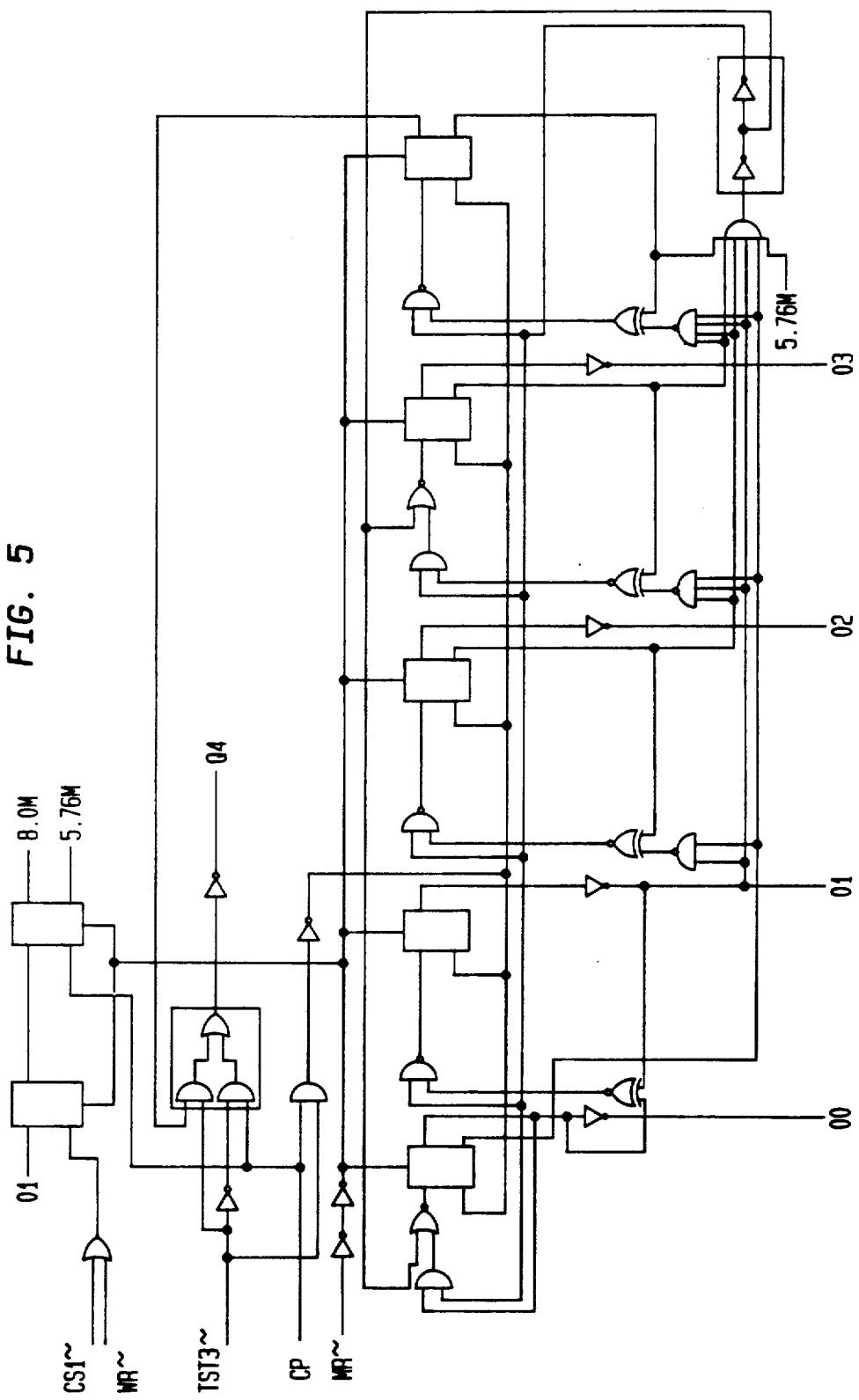

As illustrated in FIG. 2A, functionally the circuit includes an internal data bus, to which the data lines D0–D7 are coupled via a data bus buffer 401. The data bus buffer 401 is controlled by a read/write control logic circuit 402, to which the Reset, Clock, A0, A1, Read, Write and CEN signals are directed. A line control circuit 403 is to receive the CTS and DSR signals, and to output the RTS signal.

The transmit buffer 404 is coupled to the data bus to provide serial output signals, under the control of the transmit control circuit 405. Serial input signals are buffered via the Receive Buffer 406 under the control of the receive control circuit 407.

A DMA control circuit 409 is to output the DRQT and DRQR signals, and to receive the DACKT and DACKR signals. In addition, an interrupt control circuit 410 is to notify the CPU of a pending interrupt.

The logic circuit 500 contains the major functional blocks of the controller and the data Bus turnaround logic. This circuit is illustrated in more detail in FIG. 3, wherein:

Block 510 is a decoder for the address bus (A0,A1) and chip enable (CEN) in order to access command, status and data registers. The circuit is shown in greater detail in FIG. 4.

Block 511 is a scaler for scaling the input clock frequency down to the 4 microsecond clock period used by the remaining functional blocks. This circuit is shown in greater detail in FIG. 5. This circuit contains a counter that can be programmed to accept either 5.76 MHZ or 8.00 MHZ clock input frequencies.

Block 512 receives parallel data off the data bus and develops serial data streams for the Echoplex mode and the RS-232 mode. The logic for this circuit is illustrated in FIGS. 6, 7, 8, 9 and 10. A functional block diagram of this circuit for the Echoplex mode is shown in FIG. 11, and for the RS232 mode is shown in FIG. 11A.

Figure 6:
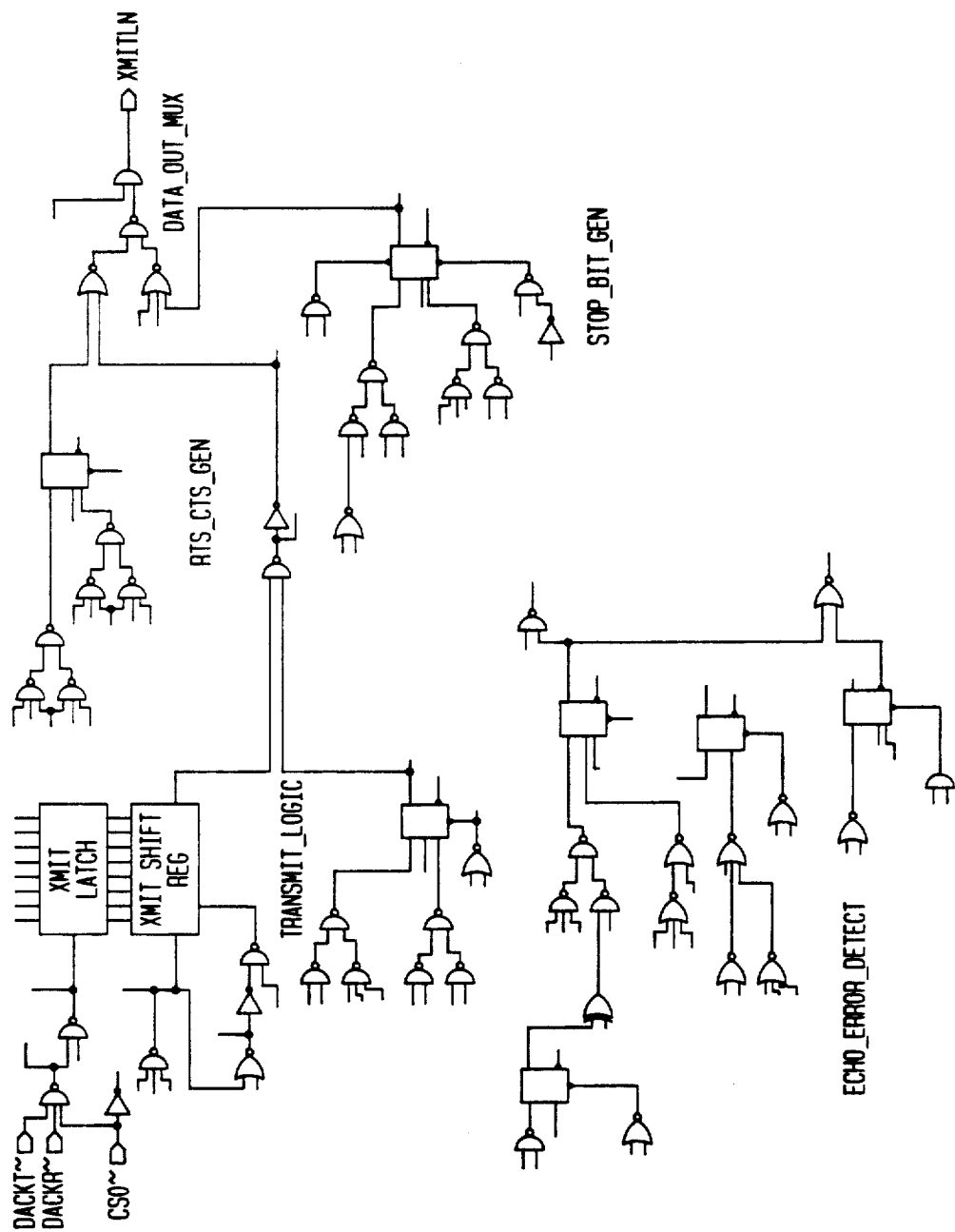

FIG. 6 illustrates the logic for generating Request to Send and Clear to Send signals (RTS_CTS_GEN) in the Echoplex mode, the data transmitter (TRANSMIT_LOGIC), the Echo Error logic (ECHO_ERROR_DETECT), the stop bit generator (STOP_BIT_GEN), and the data out multiplexer (DATA_OUT_MUX) that builds the serial message.

Figure 7:
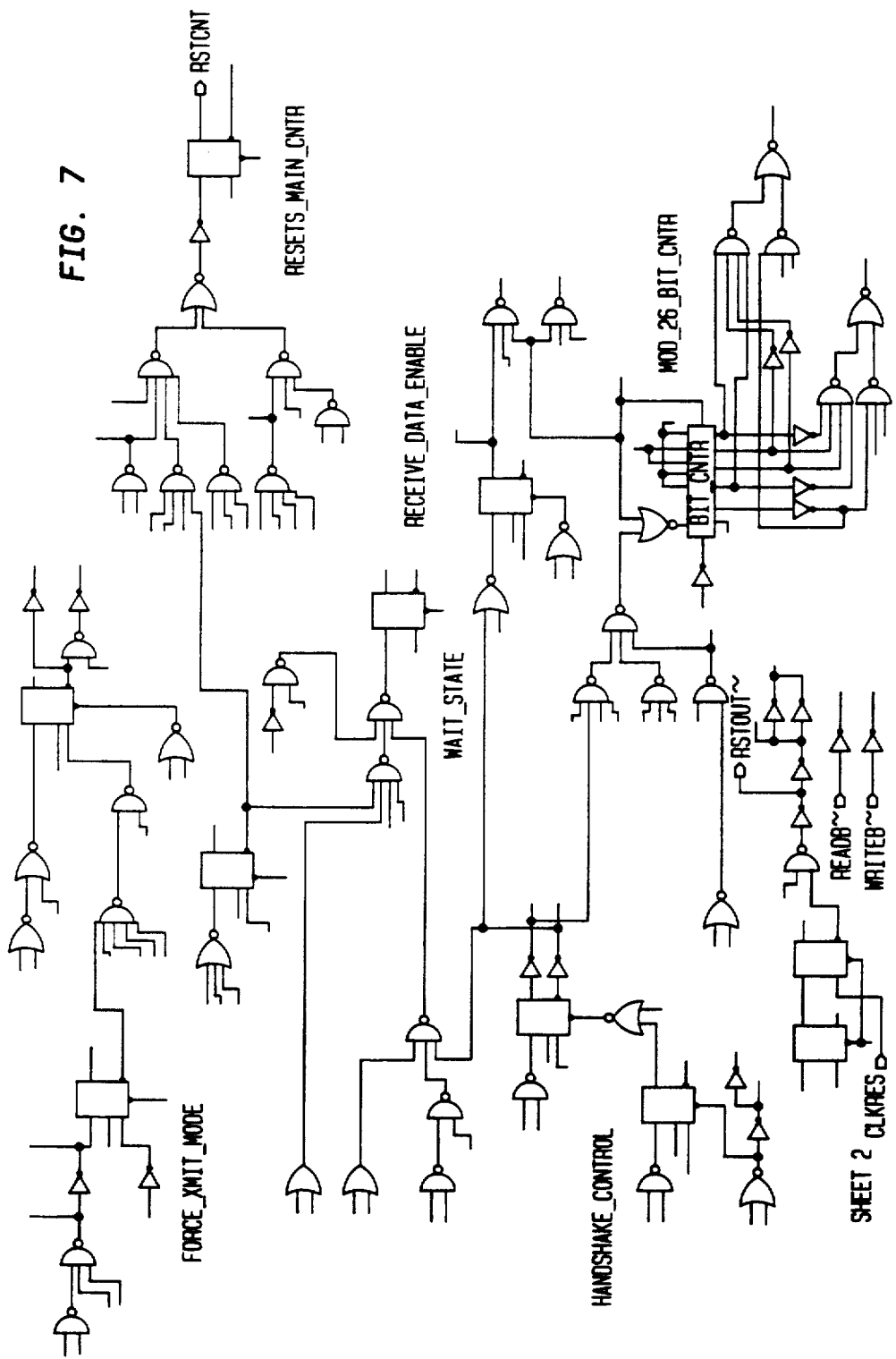

FIG. 7 illustrates the TRANSMIT/RECEIVE mode control logic (XR_MODE_CONTRL) for Echoplex which puts the controller in the transmit or receive mode, the logic to handle the RTS/CTS handshaking (HANDSHAKE_CONTROL), and the Echoplex data receiver timing and control (RECEIVE_DATA_ENABLE) & (MOD_26_BIT_CNTR).

Figure 8:
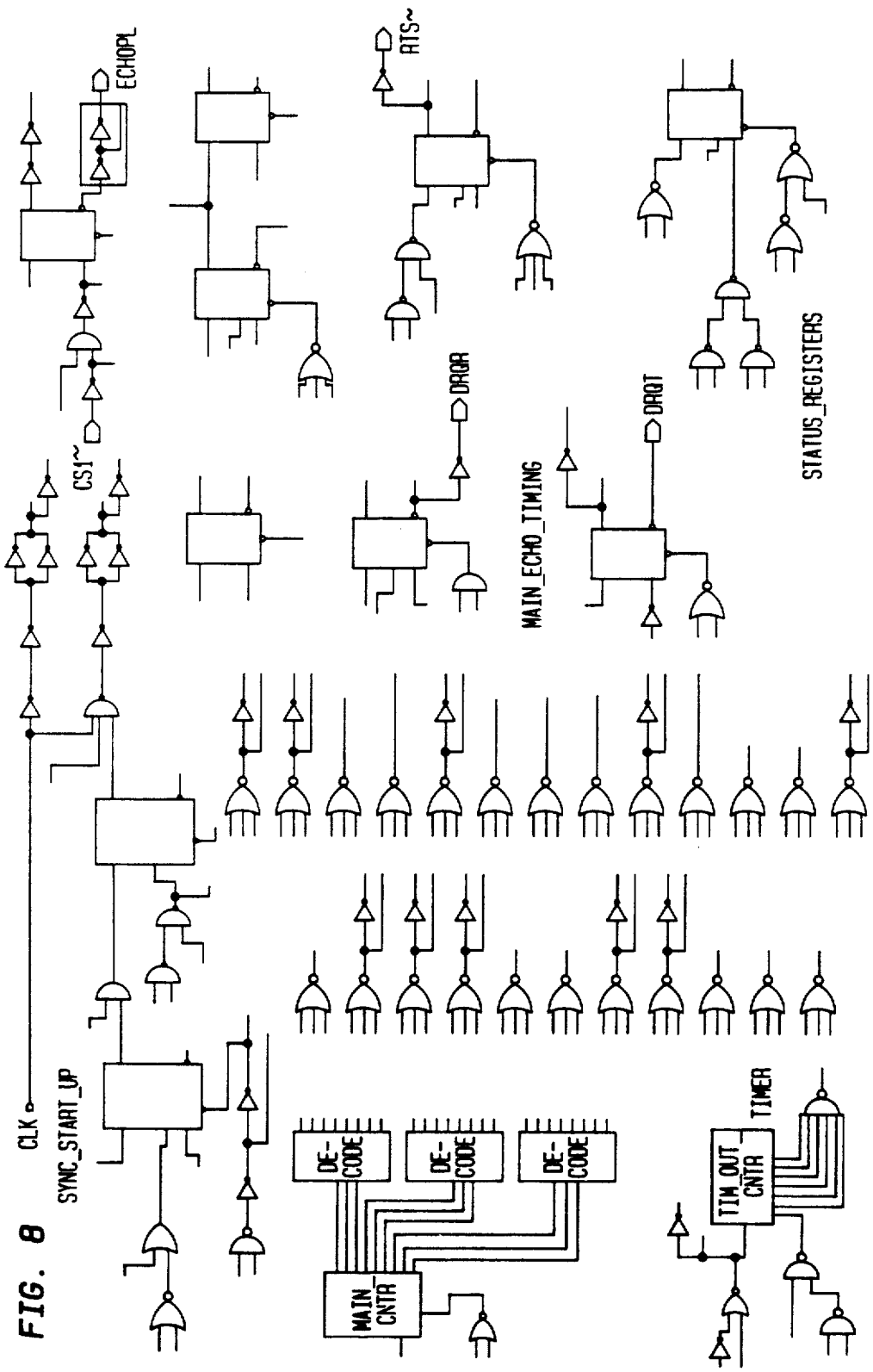

FIG. 8 illustrates the main counter and decoders which establish when events will occur. The decoders are temporally labeled, that is, CNT_32 occurs 32 microseconds after the start of the transmit or receive cycle. This figure also illustrates the logic to start the transmit or receive cycle in sync with the controller's clock when the CPU system clock is asynchronous to the clock on the controller (SYNC_START_UP), and includes the status registers (STATUS_REGISTERS).

Figure 9:
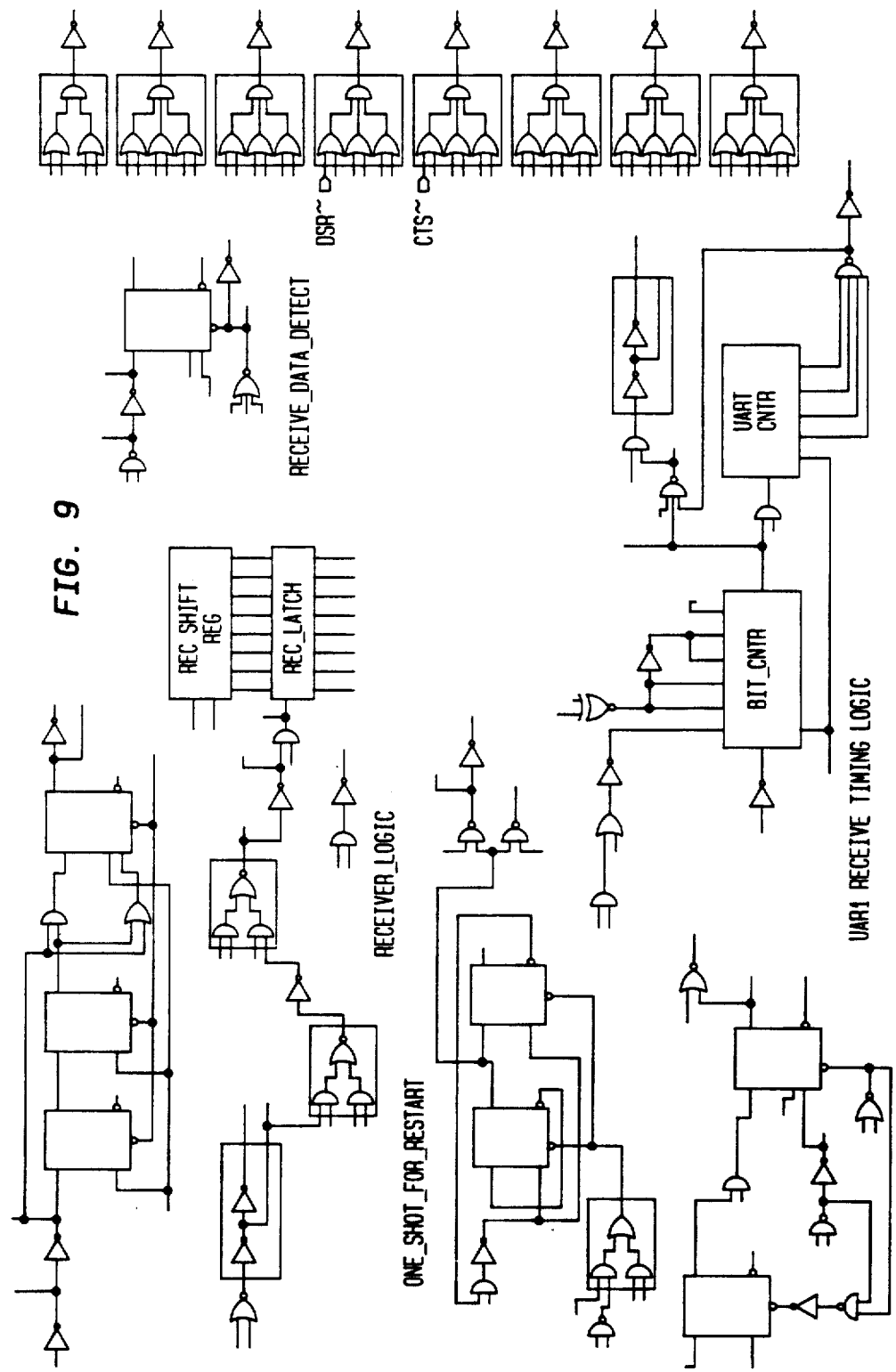

FIG. 9 illustrates the data receiver (RECEIVER_LOGIC), (RECEIVER_DATA_DETECT) & (ONE_SHOT_FOR_RESTART). It also illustrates the RS-232 receiver timing and control (UART_RECEIVE_TIMING_LOGIC), and the multiplexer for the two status registers onto the data bus.

Figure 10:
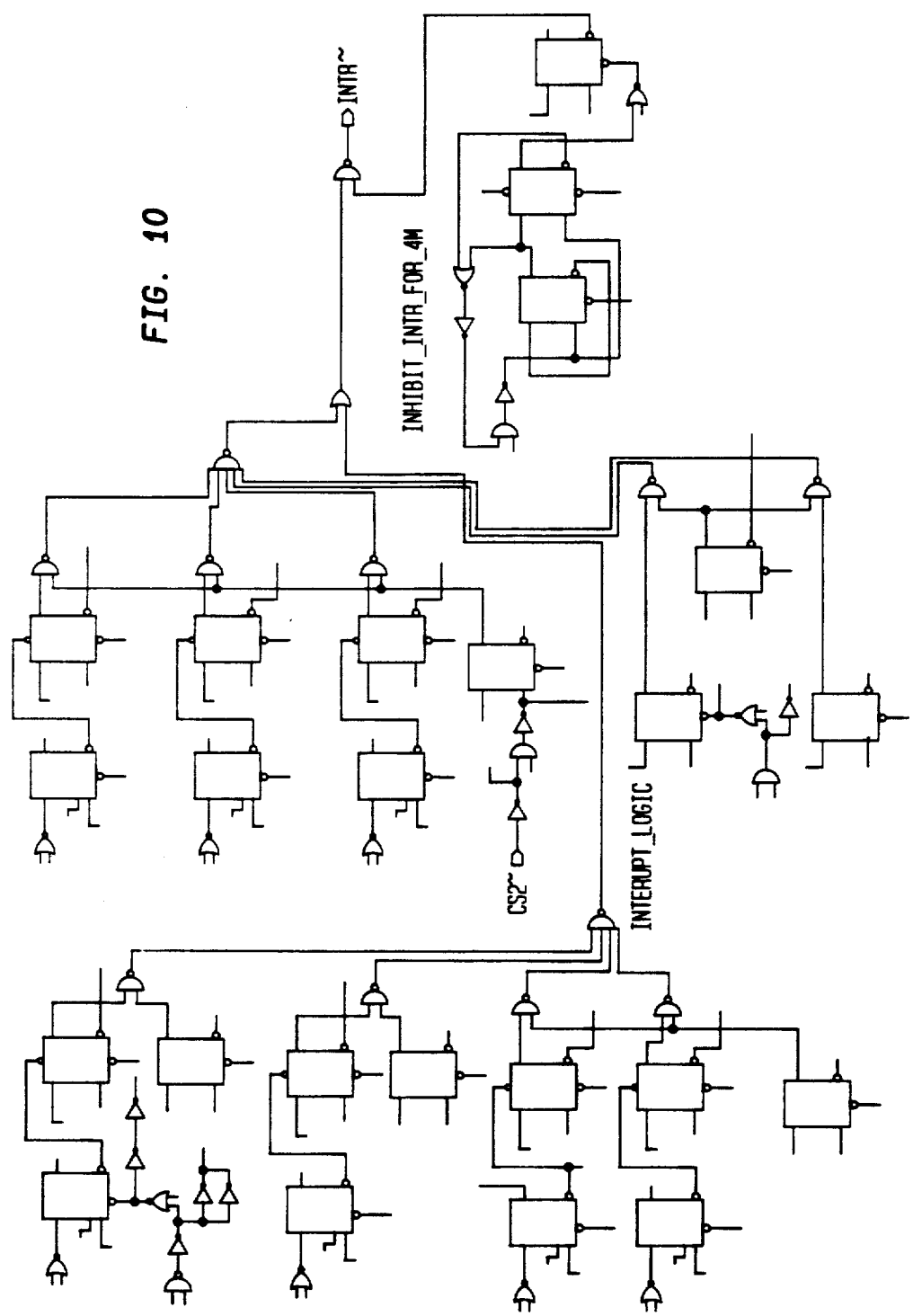

FIG. 10 illustrates the interrupt logic.

FIG. 11 illustrates functionally, operation of the controller of the invention in the Echoplex mode. The mode control circuit 600, determines whether the circuit is in the transmit mode or the receive mode. This mode is determined by the status of the registers in the circuit, as discussed above. In the transmit mode, signals are received from the internal data bus via the transmit buffer latch 601, the status of the buffer being stored in a register as a transmit buffer empty or full flag (TBE) 602. This data is directed in parallel to the transmit shift buffer 603 and shifted out in series, under the control of the mode control circuit 600, to the data out multiplexer 605. The multiplexer also outputs the RTS and CTS signals from generator 606, and the output of the EOB/EOM stop bit generator 607. The serial signals are also applied to a data bit latch 608 for comparison with echo signals in the comparator 609, to output an echo error flag from the circuit 610 to the multiplexer 605 in the event of an error.

In the Echoplex receive mode signals received on the RXD input are shifted into the receiver shift register 620 under the control of the mode control circuit 600, for application in parallel to the receive buffer latch 621, and thence to the parallel internal bus. The flag 622 is controlled by the contents of the buffer latch 621. In Echoplex reception, the received signals are applied to the data latch 623 for echo transmission to an originating transmitter.

FIG. 11A illustrates the functional operation of the system of FIG. 3 in the transmit and receive modes, when RS-232 communication is employed. In the transmission mode, the bytes to be sent are first loaded, and then tests are made for clear-to-send and transmit-buffer-empty signals. If the message is not complete, a new byte is loaded for transmission. In the receive mode, if the read buffer is full, and there is no receiver over-run error, the read buffer is read. This process is repeated as long as the incoming message directs signals to the read buffer.

Figure 12:
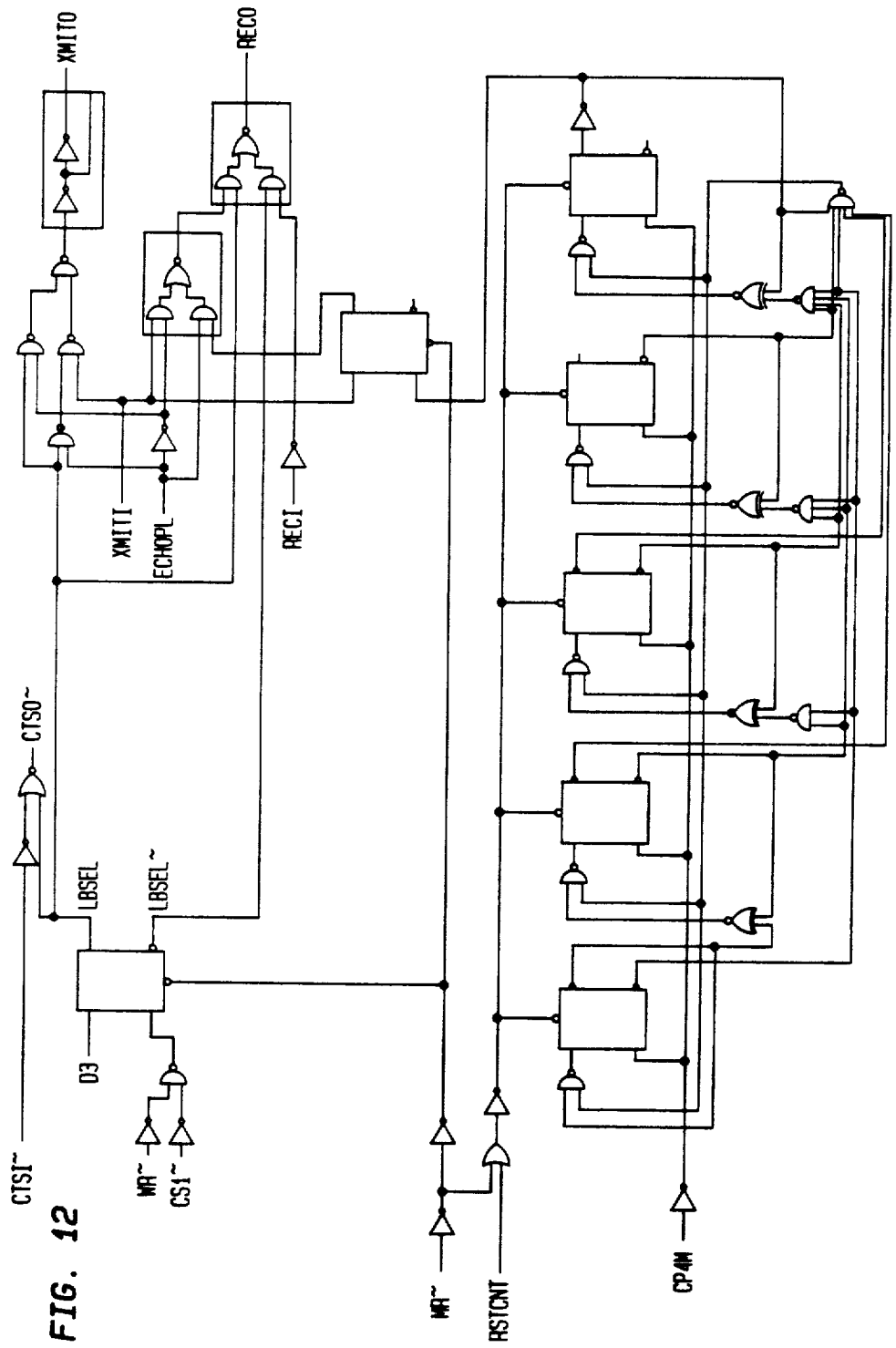

Block 513 of FIG. 3 connects the transmit line to the receive line in a self test feature. A more detailed illustration of this circuit is shown in FIG. 12. In the Echoplex mode, the transmit signal is delayed on the receive line to simulate an echoed signal. In the RS-232 mode, there is no delay.

Figure 13:
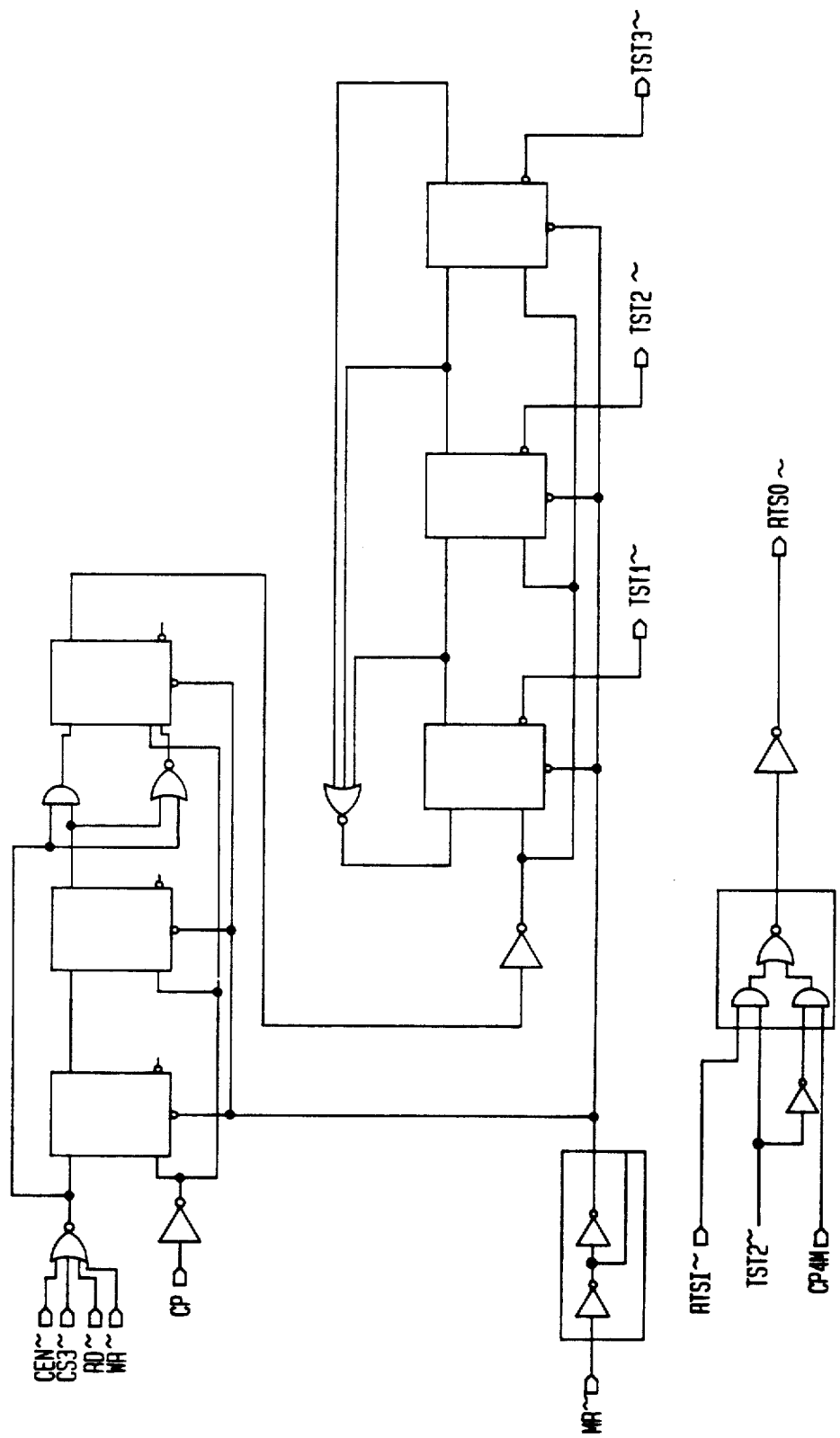

Block 514 of FIG. 3 contains the logic for facilitating manufacturing tests, this circuit being illustrated in greater detail in FIG. 13.

Figure 14:
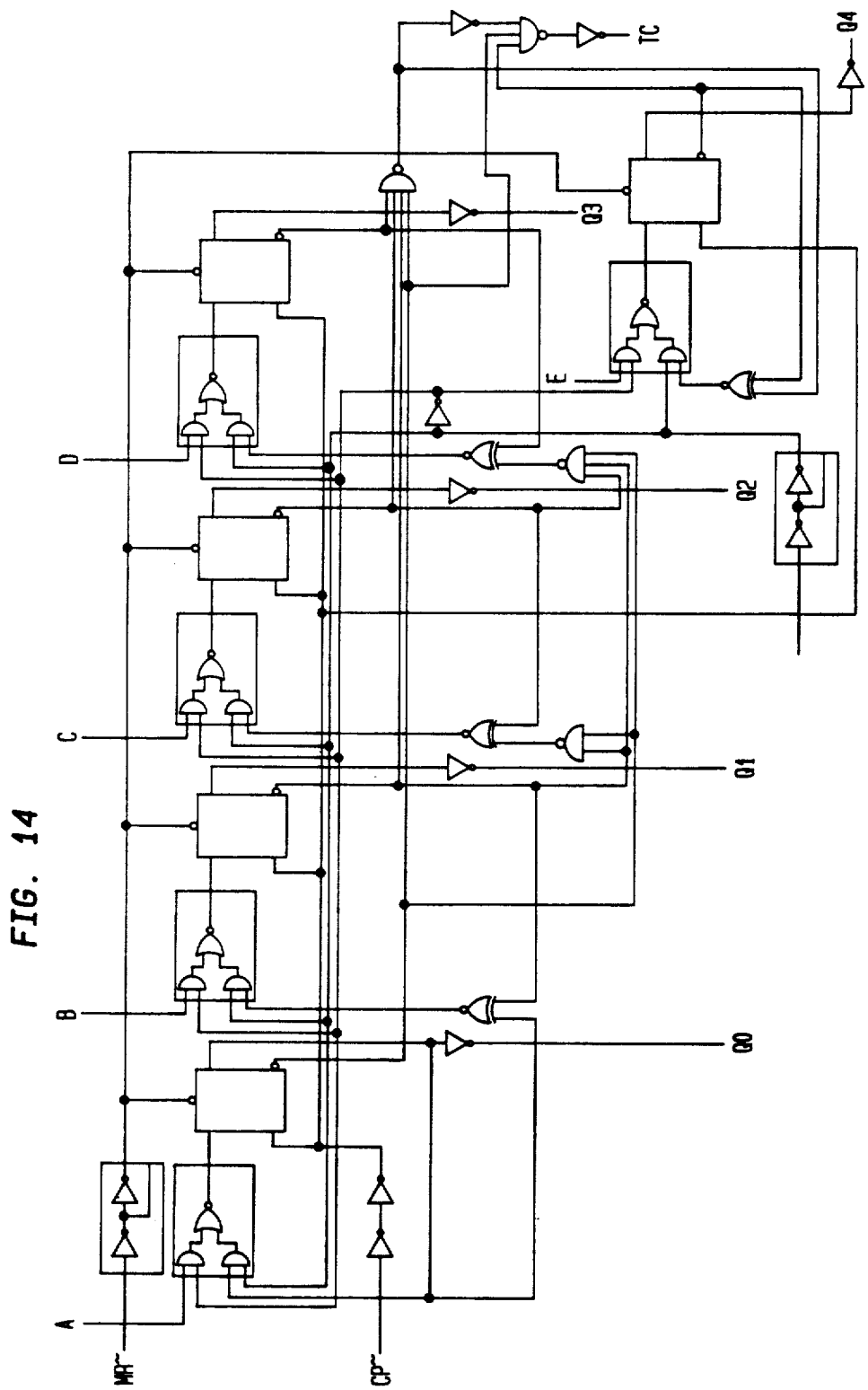

Further details of various circuits are illustrated as follows:

FIG. 14 illustrates the BIT_CNTR circuit of FIGS. 7 and 9.

Figure 15:
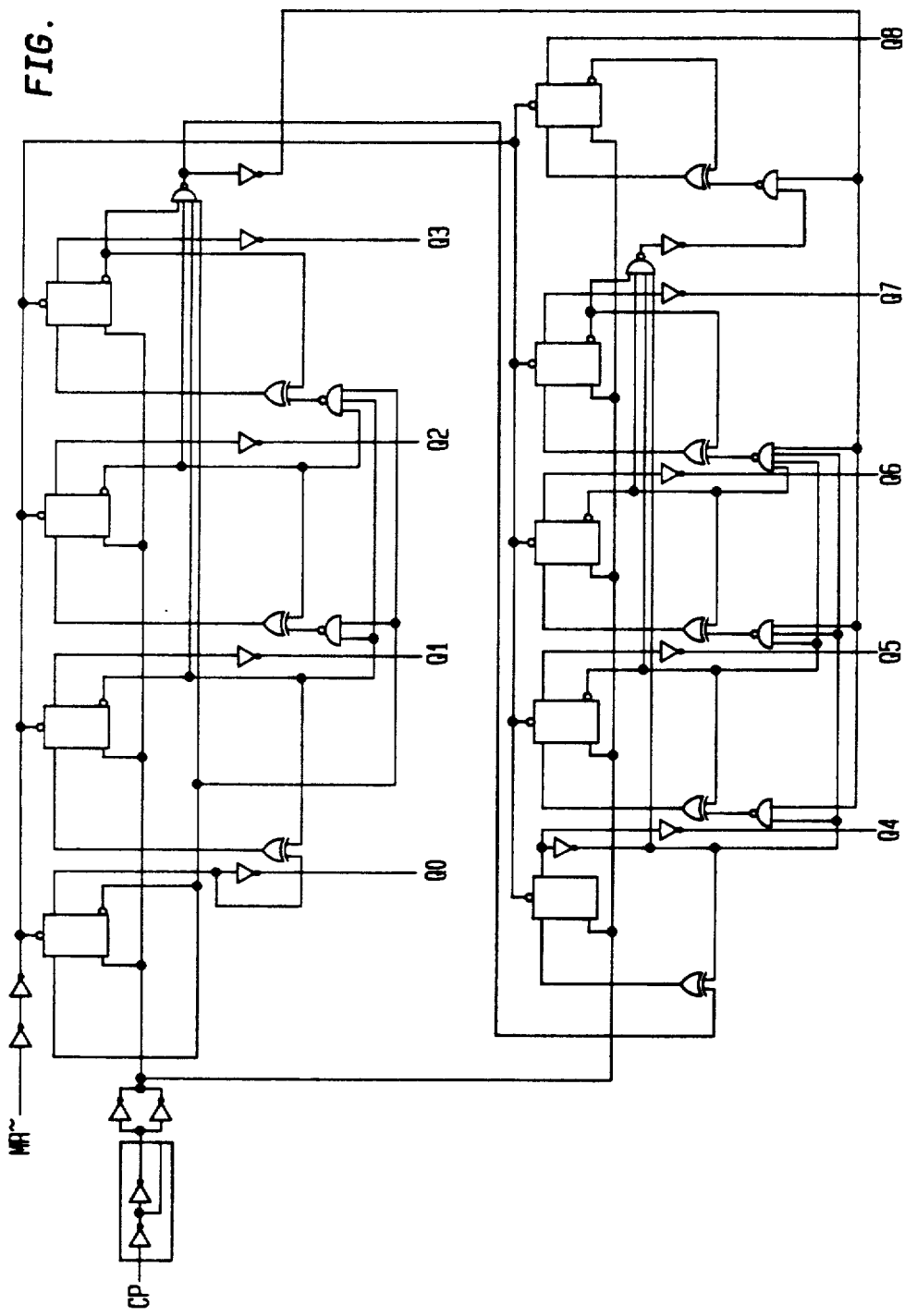

FIG. 15 illustrates the MAIN_CNTR circuit of FIG. 8.

Figure 16:
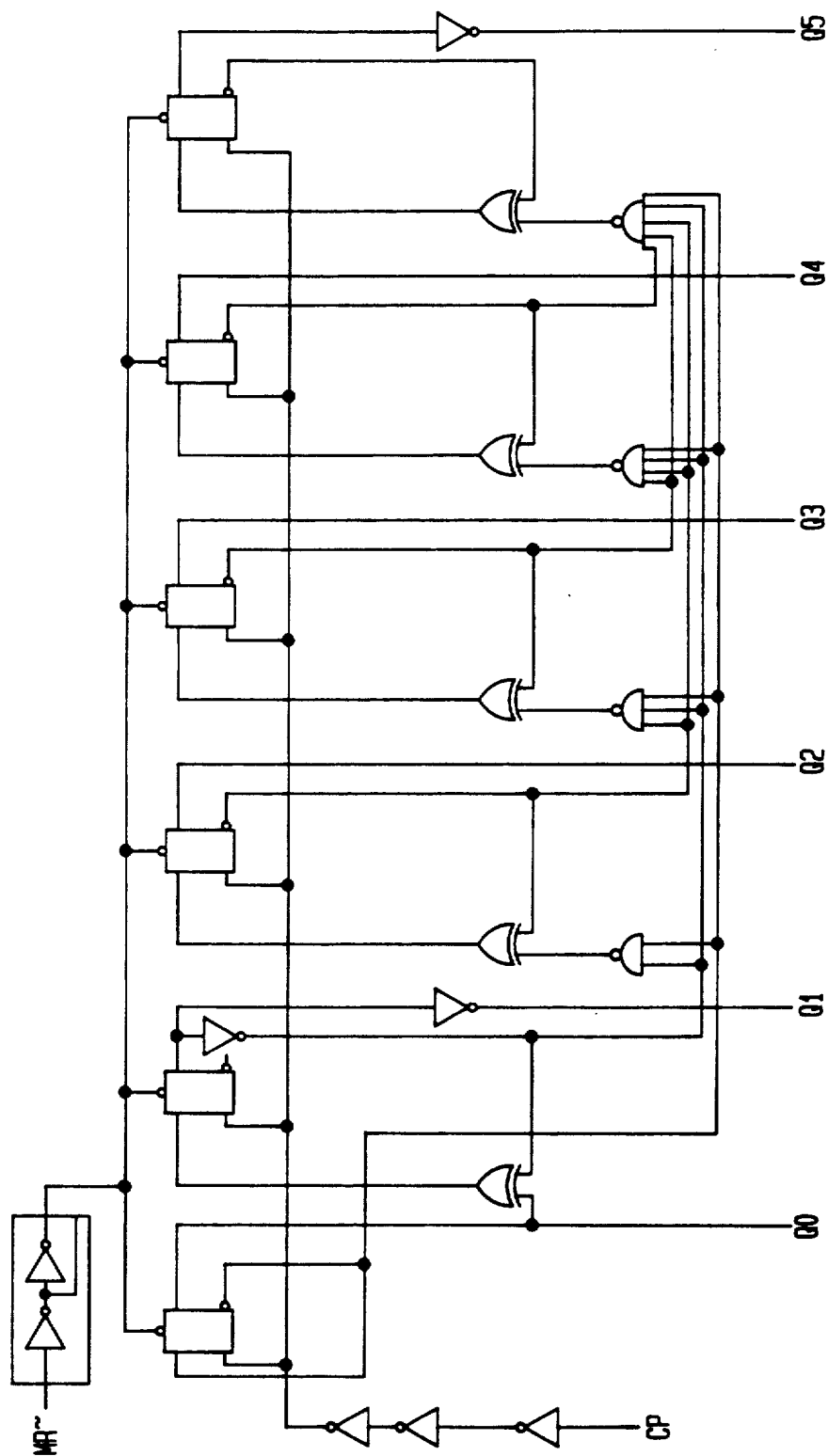

FIG. 16 illustrates the TIM_OUT_CNTR circuit of FIG. 8.

Figure 17:
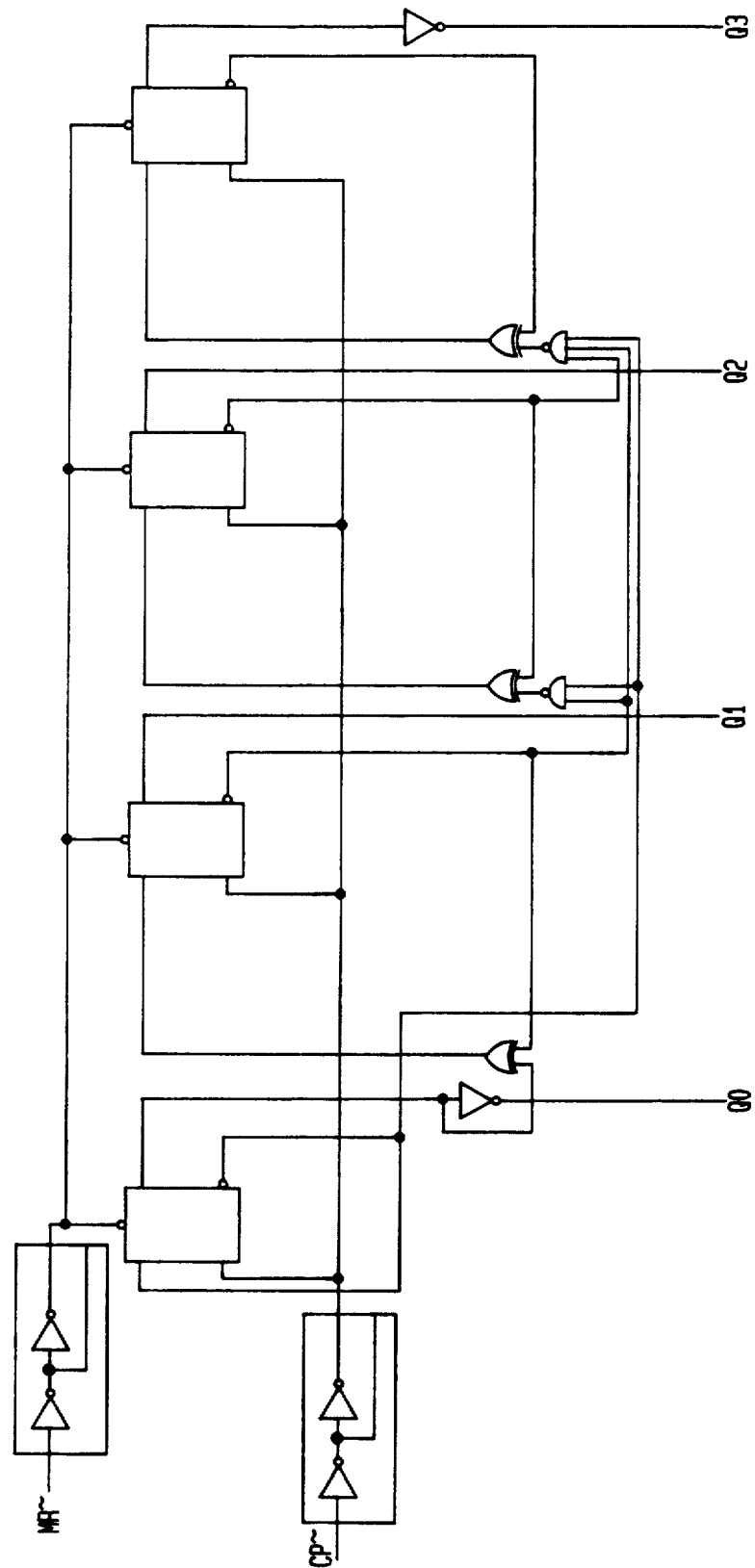

FIG. 17 illustrates the UART_CNTR circuit of FIG. 9.

Figure 18:
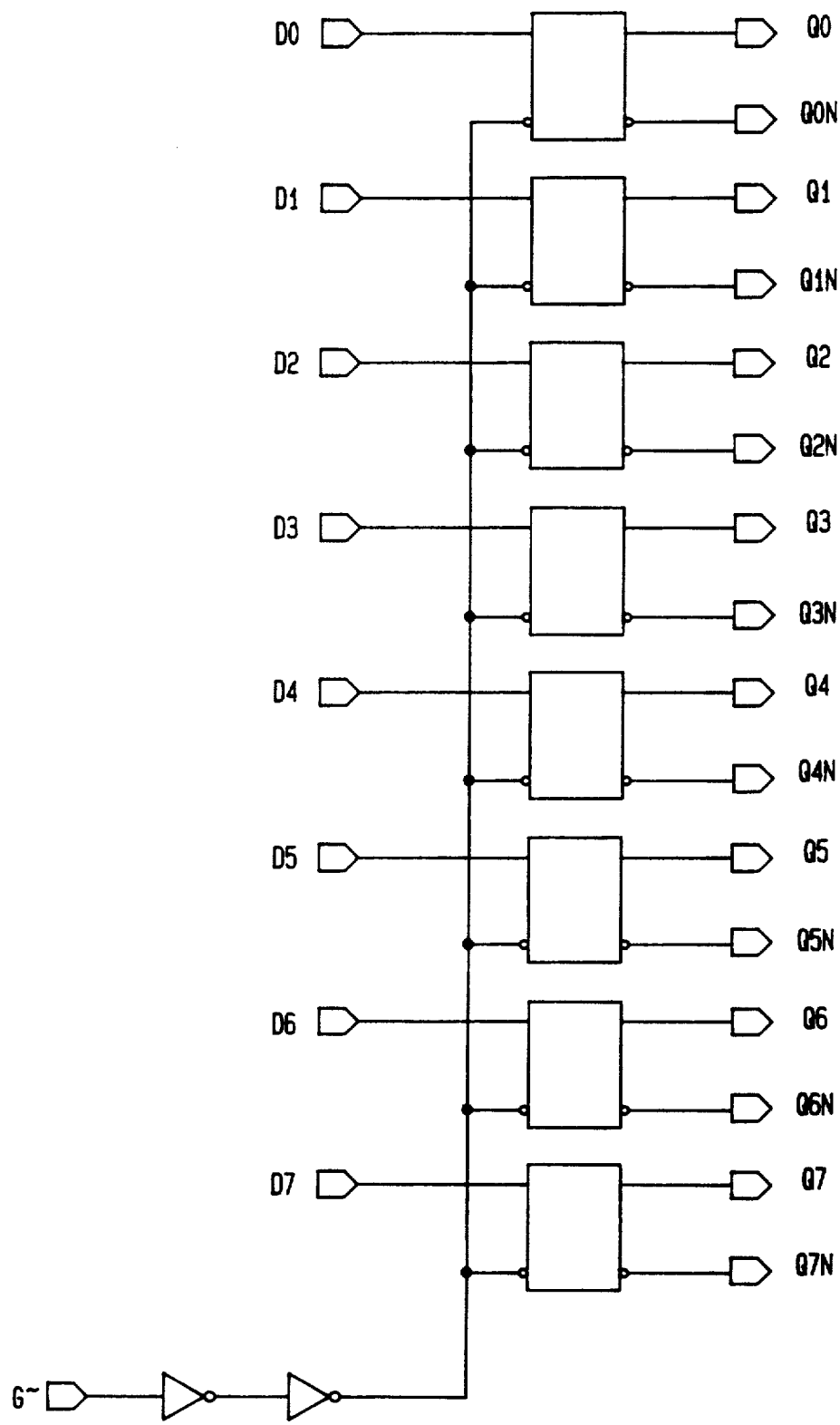

FIG. 18 illustrates the XMIT_LATCH circuit of FIG. 6.

Figure 19:
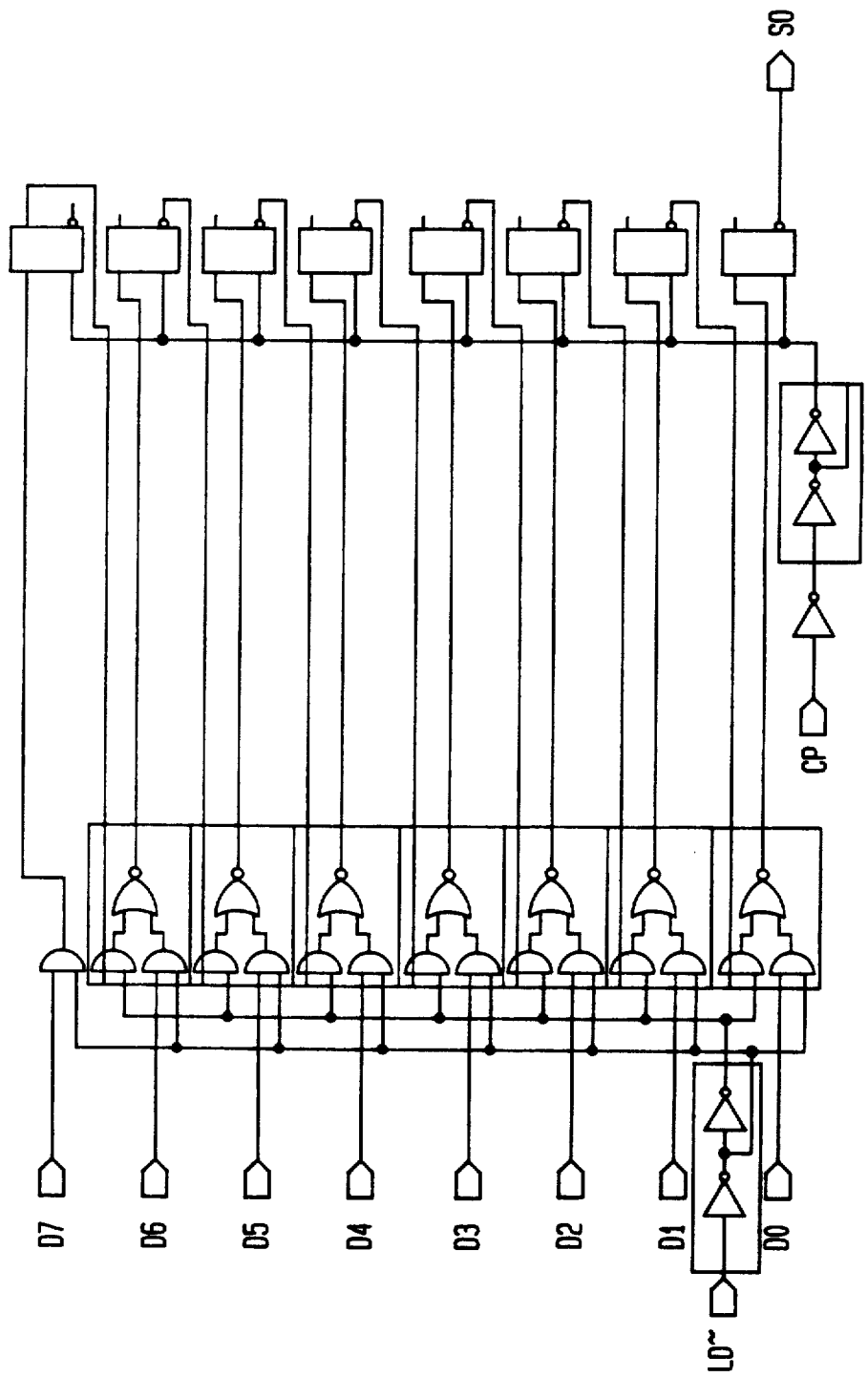

FIG. 19 illustrates the XMIT_SHIFT_REG circuit of FIG. 6.

Figure 20:
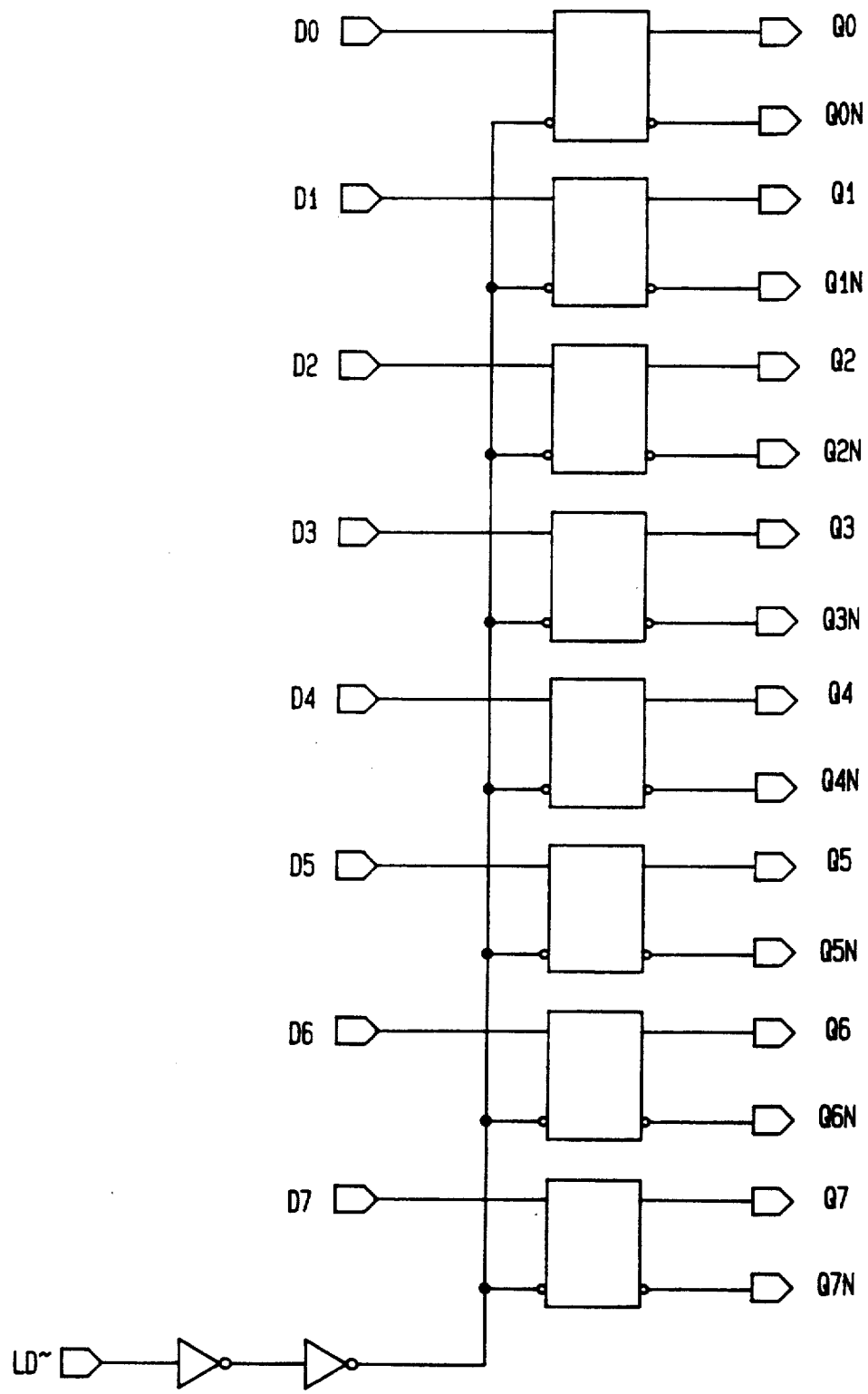

FIG. 20 illustrates the REC_LATCH circuit of FIG. 9.

Figure 21:
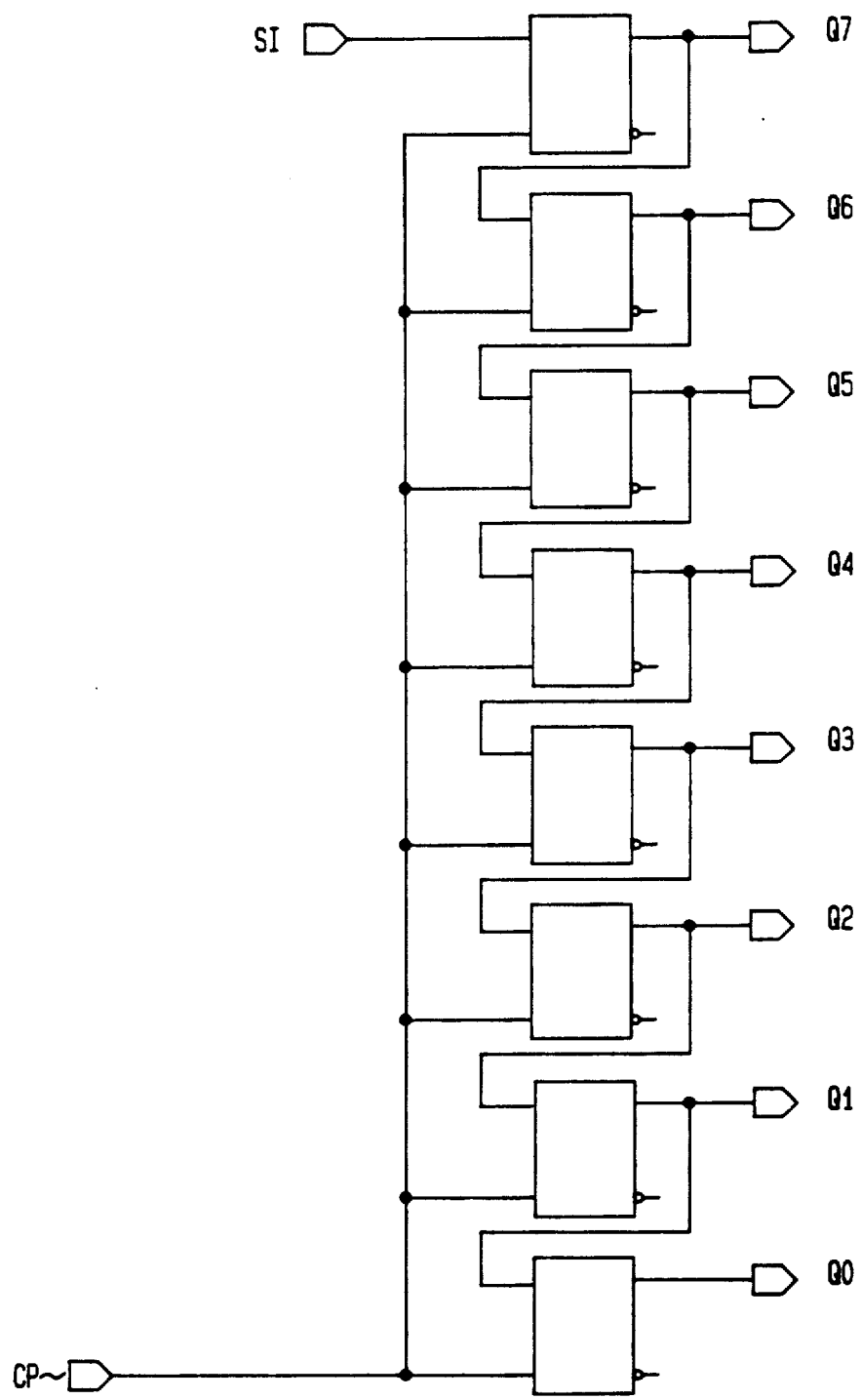

FIG. 21 illustrates the REC_SHFT_REG circuit of FIG. 9.

Figure 22:
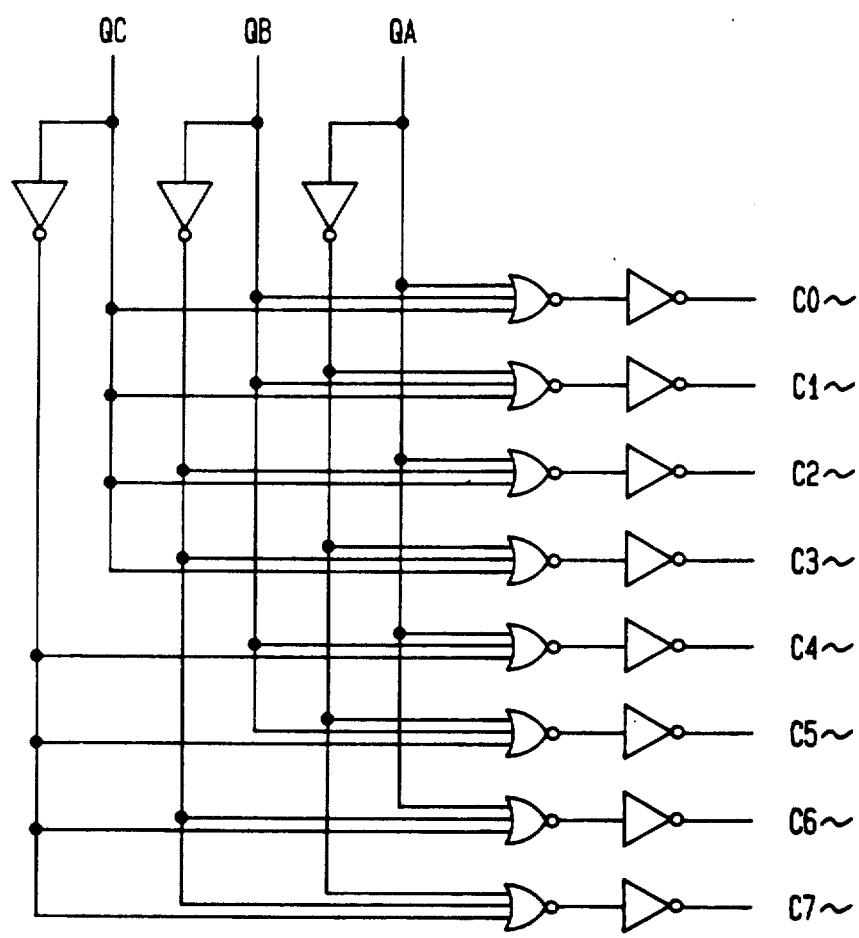

FIG. 22 illustrates the DECODE circuit of FIG. 8.

These circuits are self explanatory, and hence will not be discussed in detail.

FIG. 23 illustrates the operation of the controller in RS232 transmit mode. RS232 transmit mode operation begins with loading of a byte into the transmit latch (step 702), which can occur only if the TBE flag has been set. Also, the loading of a byte into the transmit latch causes the TBE flag to be reset. If the transmit shift register is empty (step 704), the byte is loaded into the transmit shift register from the transmit latch, the TBE flag is set and an interrupt request is made (step 706). The controller then activates RTS (step 708) and then waits for the CTS line to become active. When (CTS~ becomes active (step 710), the byte is transmitted from the transmit shift register (step 712) on line TXD. If there is another byte to be loaded (step 714), the operation begins again at step 702. Otherwise, the operation ends.

FIG. 24 illustrates the operation of the controller in the RS232 receive mode. The process begins when a byte is received in the receive shift register (step 722). The byte is then transferred to the receive latch, the RBF flag is set, and an interrupt request is made (step 724). If a receiver overrun error occurs (step 726) the receiver overrun flag is set (step 728). The microprocessor then determines whether to continue (step 730) or to abort the message (step 732). If there has been no receiver overrun error (step 726), or if the microprocessor determines to continue receiving (step 730), the controller waits for the receive latch to be read (step 734). Once the receive latch has been read, the controller resets the RBF flag (step 736), and the operation ends.

FIG. 25 illustrates operation in the Echoplex transmit mode. Operation begins with loading of a byte into the transmit latch (step 742), which can occur only if the TBE flag has been set. Also, the loading of a byte into the transmit latch causes the TBE flag to be reset. If the transmit shift register is empty (step 744), the byte is loaded from the transmit latch into the transmit shift register and the TBE flag is set (step 746).

RTS~ is then activated (step 748). The controller then waits until line CTS~ is activated (step 750). If CTS~ is not activated within 3.5 msec the communication time out interrupt is activated (step 751), the microprocessor aborts sending the message (step 753) and the process ends. If CTS~ is activated within 3.5 msec, the controller transmits the byte from the transmit shift register via line TXD and the transmit shift register is cleared (step 752). Step 754 illustrates that is another byte has not been loaded (step 742) within 1 msec after the TBE flag was set (step 746), the controller determines that the message is ending, and generates an end of message bit to the transmission (step 755). The controller then checks to see if there was an echo error (step 758). If so, the microprocessor determined whether to retry transmission (step 756). If transmission is to be retried, the operation begins again with step 742. Otherwise, the operation ends.

Returning to step 758, if no echo error was found, the controller sends a no error pulse (step 760), and then activates an end of message interrupt (step 762). The operation then ends.

FIG. 26 illustrates operation of the controller in Echoplex receive mode. The operation begins with receipt of a byte, serially, bit-by-bit, via line RXD, into the receive shift register (step 772). The byte is then transferred from the receive shift register to the receive latch, the RBF flag is set, and an interrupt is initiated (step 774). If the controller detects a receiver overrun error (step 776), it sets the receiver overrun flag (step 778). The microprocessor then determines whether or not to continue (step 780). If the microprocessor determines not to continue, the message is aborted (782). If it is determined to continue, or if there was not receiver overrun error, the controller then waits until the receive latch is read (step 784). Once the receive latch has been read, the controller resets RBF. If the most recent byte did not contain an end of message bit (step 788), the process begins again with step 772. If the most recent byte did contain and end of message bit, the controller checks for the no error pulse (step 790). If the no error pulse is received, the operation ends. If the no error pulse is not received, the controller sets an error flag (step 792) and the message is aborted (step 782).

Except for 2 resistors, the Echoplex driver and receiver circuits are resident on the chip, as seen in FIG. 30.

The driver and receiver circuits for interfacing directly to an RS-232 external device are not resident on the chip and must be added externally, as seen in FIG. 27. The same driver and receiver circuits on the chip are used in the RS-232 mode as were used in the Echoplex mode.

To perform data transfers between the CPU and the Controller chip in a DMA (direct memory access) mode, an external DMA controller such as an Intel 8237 must be used in conjunction with the chip, as seen in FIG. 29.

The external DMA controller must perform in the following manner.

In transmit mode, the DRQT port will go high when the transmit buffer is empty and ready to accept data. The DMA controller must send an active low pulse to the DACKT⁻ port in order to strobe new data into the Echoplex Controller chip. Data must be stable at the trail edge of the DACKT⁻ pulse. The lead edge of the DACKT⁻ pulse will clear the DRQT port. CEN⁻ does not have to be active for this operation.

In receive mode, the DRQR port will go high when the receive buffer is full and ready to transfer data. The DMA controller must send and active low pulse to the DACKR⁻ port in order to strobe new data out of the Echoplex Controller chip. Data will be stable at the trail edge of the DACKR⁻ pulse. The lead edge of the DACKR⁻ pulse will clear the DRQR port. CEN⁻ does not have to be active for this operation.

Prior to starting data transmission or reception, the Controller chip must be loaded with a set of control words generated by the CPU. These control signals define the complete functional definition of the chip and must immediately follow a reset operation (software reset or hardware reset).

The control words are split into two formats:

1. MODE CONTROL (COMMAND REGISTER #1)

2. INTERRUPT MASK CONTROL (COMMAND REGISTER #2)

COMMAND REGISTER #1 will establish the various modes the chip can assume.

The chip can be selected for ECHOPLEX mode or RS-232 (UART) mode.

In the Echoplex mode, the chip can be selected to be a Priority or Non-Priority device. In priority mode, the sender does not have to test for line contention, because it has priority. In non-priority mode the sender must test the line for contention and if contention exists, it must relinquish the line to allow the contending device to be the sender. If line contention does occur, the transmit message is not flushed and will be sent after the contending message is received.

The chip can be placed in a Self Test mode where the transmit line is internally tied to the receive line. In Echoplex mode, only the transmit operation is tested. In RS-232 UART mode, both the transmit and receive operations are tested.

The chip can be selected to handle data transfers by DMA or by Interrupts.

The main timing for the chip is controlled by an external clock connected to the 'CLK' input pin. The clock input frequency can be either 5.76 MHZ or 8.0 MHZ. When the chip is initialized, command register #1 must be reprogrammed to identify the clock input frequency selected. Upon hardware reset, the default clock is set at 5.76 MHZ.

The chip has a software controlled Reset mode.

All modes including the Reset mode are static.

The Mode Status is stored in STATUS REGISTER #1 and displays the following:

Normal or Self Test Mode
UART or Echoplex Mode
Echoplex Priority
The State of the DSR Port (Data Set Ready)
The State of the CTS Port (Clear to Send)
DMA or Interrupt Mode (for data handling)
Transmit Buffer Empty (TBE) flag
Receive Buffer Full (RBF) flag Data transfers can be handled under interrupt control.

The DRQT port is the 'Transmit Buffer Empty' control line and the DRQT port is the 'Receive Buffer Full' control line.

The Status Register #1 contains the status of the transmit and receive buffers. Interrupts will be generated when either the transmit buffer becomes empty or when the receive buffer becomes full. Switching to the DMA control mode will disable these 2 interrupts and can be used as TBE/RBF interrupt disable.

STATUS REGISTER #2 contains the following interrupt status when in the Echoplex mode.

1) End of Transmit Message
2) End of Receive Message
3) Communications Time Out—Transmit Mode
4) Communications Time Out—Receive Mode
5) Echo Error—Transmit Mode
6) Missing 'No Error Pulse' (NEP)
7) Receiver Overrun Error
8) Status of the Interrupt Port Upon detection of an Echo Error in the Transmit mode, the Transmit line is clamped LOW as soon as the error bit of a byte is detected. The CPU is flagged of this condition by an Echo Error Interrupt. The Transmit line will remain low until the CPU services this interrupt.

COMMAND REGISTER #2 is the interrupt masking register and contains the following interrupt enables.

1) End of Transmit Message
2) End of Receive Message
3) All Receive Errors
4) All Transmit Errors Data transfer can be handled by DMA with an external DMA controller.

The following interrupts can be enabled by Command Register #2 when in the DMA mode.

1) End of Transmit Message
2) End of Receive Message
3) Communications Time Out—Transmit Mode
4) Communications Time Out—Receive Mode
5) Echo Error—Transmit Mode
6) Missing 'No Error Pulse' (NEP)
7) Receiver Overrun Error The following interrupts are disabled while in the DNA mode.

1) Transmit Buffer Empty
2) Receiver Buffer Full

The DMA controller must have at least 2 channels, one programmed for transmit to service the DRQT and DACKT ports and one programmed for receive to service the DRQR and DACKR ports.

Full Duplex Asynchronous Receiver/Transmitter to be used for RS-232 applications. Word format and Baud rate are fixed.

| Fixed Word Format - (10 bits total) | 1 Start Bit<br>8 Data Bits (lab sent first)<br>1 Stop Bit |
|---|---|

There is no parity bit available.
Fixed Baud Rate is 9600 bps.
RTS (Request to Send)/CTS (Clear to Send) are available in the transmit mode only. When the RTS line is raised, the transmit operation is suspended indefinitely (no time out) until a CTS is detected.

Interrupts occur under the following conditions.
In Interrupt control mode:
1) Receiver Overrun Error
2) Transmit Buffer Empty (TBE)
3) Receive Buffer Full (RBF)
In DMA control mode:
1) Receiver Overrun Error The Receiver Overrun Error interrupt in either mode can be masked through Command Register #2.

The controller has the following registers:
DATA REGISTERS: (CHIP SELECT+ADDRESS 0)

This data transfer mode is available in both DMA and Interrupt control modes.

| COMMAND REGISTER #1: | MODE SELECTION (CHIP SELECT + ADDRESS 1) | | | | | | |
|---|---|---|---|---|---|---|---|
| D7 | D6 | D5 | D4 | D3 | D2 | D1 | D0 |
| RESET | UART/ ECHOPLEX MODE | ECHOPLEX PRIORITY | UNUSED (0) | SELF TEST MODE | DMA/ INTR MODE | CLK IN | UNUSED (0) |

| RESET | 0 Clear Reset | When clearing a Reset, a 00H Byte must be issued by Command Register #1. (default) |
|---|---|---|
| | 1 Resets Chip | To Reset, a 80H Byte must be issued. Remains Reset until a 00H is issued. |

UART/ECHOPLEX MODE    0  Echoplex Mode (default)
    1  RS-232 UART Mode
ECHOPLEX PRIORITY    0  Low Priority (default)
    1  High Priority
SELF TEST MODE SELECTION    0  Normal (default)
    1  Self Test - loop back
DMA/INTR MODE (DATA TRANSFER)    0  DMA Mode (default)
    1  Interrupt Mode
NOTE: In DMA Mode the TBE and RBF interrupts are disabled.
CLK IN (Clock input select)    0  5.76 MHZ (default)
    1  8.00 MHZ
NOTES: The 'default' state is after a Hardware Reset.
The Software Reset performs the same function as the Hardware Reset except the CLK IN selection is not altered.
All Command Registers' UNUSED bits should be set to 0 for future compatibility.

| STATUS REGISTER #1: | GENERAL STATUS (CHIP SELECT + ADDRESS 1) | | | | | | |
|---|---|---|---|---|---|---|---|
| D7 | D6 | D5 | D4 | D3 | D2 | D1 | D0 |
| NORMAL | UART/ ECHOPLEX MODE | ECHOPLEX PRIORITY | DSR | CTS | DMA/ INTR MODE | TBE | RBF |

NORMAL    0 Normal Operation
    1 Self Test Mode selected
DSR    Current state of DSR port (active high)
CTS    Current state of CTS port (active high)
TBE    Transmit Buffer Empty flag (active high)
RBF    Receive Buffer Full flag (active high)
All other bits are echoes of Command Register #1.

| COMMAND REGISTER #2: | INTERRUPT ENABLE (CHIP SELECT + ADDRESS 2) | | | | | | |
|---|---|---|---|---|---|---|---|
| D7 | D6 | D5 | D4 | D3 | D2 | D1 | D0 |
| UNUSED | RX | TX | RX | UNUSED | UNUSED | TX | UNUSED |

| (0) | END OF MESSAGE | END OF MESSAGE | ERRORS | (0) | (0) | ERRORS | (0) |
|---|---|---|---|---|---|---|---|

RX END OF MESSAGE - End of received Echoplex message (active high)
TX END OF MESSAGE - End of transmitted Echoplex message (active high)
RX ERRORS - Enables all receive error interrupts (active high)
TX ERRORS - Enables all transmit error interrupts (active high)
All interrupts are disabled after reset.
STATUS REGISTER #2: INTERRUPT STATUS
(CHIP SELECT + ADDRESS 2)

| D7 | D6 | D5 | D4 | D3 | D2 | D1 | D0 |
|---|---|---|---|---|---|---|---|
| INTR | RX END OF MESSAGE | TX END OF MESSAGE | RX OVER RUN | RX NO START BIT | RX NEP MISSING | TX CTS TIME OUT | TX ECHO ERROR |

INTR - Interrupt flag (active high)
RX END OF MESSAGE - End of received message in Echoplex mode (active high)
TX END OF MESSAGE - End of Transmit message in Echoplex mode (active high)
RX OVERRUN - Receiver overrun available in both Echoplex and RS-232 UART modes (active high)
RX NO START BIT - Receiver did not receive a valid start bit after sending a CTS in Echoplex mode and has timed out (active high). Time out time is 3.5 milliseconds maximum.
RX NEP MISSING - Receiver did not receive a valid 'No Error Pulse' in Echoplex mode (active high)
TX CTS TIMEOUT - Transmitter has not received a valid CTS after sending a RTS in Echoplex mode and has timed out (active high). Time out time is 3.5 milliseconds maximum.
TX ECHO ERROR - Transmitter has not received a valid echo bit in Echoplex mode and has clamped the transmit line low as soon as the error bit was detected (active high).

The Reset bit in Command Register #1 performs the same function as the hardware Reset performed through the RST pin except the clock selection (CLK IN) is not altered. Once the Reset bit is set by sending a '1' to the Echoplex Controller chip through Command Register #1, it remains set until it is cleared by sending a '0' to the chip through Command Register #1. The chip must remain in the Reset state for a minimum of 12 microseconds before a Clear Reset can be issued.

The Reset state places the chip in Echoplex Non-Priority mode, clears the Self Test mode to normal operation, places the chip in DMA data handling mode, clears the TBE and RBF flags, clears all Interrupt flags, clears the Interrupt Enable register, places the Receiver and Transmitter in the idle state causing the TXD output to go low, and (after hardware reset only) sets the chip to accept the 5.76 MHZ input Clock frequency.

While the invention has been disclosed and described with reference to a single embodiment, it will be apparent that many variations and modifications may be made therein, and it is therefore intended in the following claims to cover each such variation and modification as falls within the true spirit and scope of the invention.

What is claimed is:

1. An integrated circuit communication interface device, comprising:
   a plurality of first terminals adapted to be connected to separate parallel data lines;
   a serial data output terminal;
   a serial data input terminal;
   an internal parallel data bus;
   a parallel data buffer, said data buffer connecting said first terminals to the data bus;
   a transmit buffer, said transmit buffer connecting said serial output terminal to the data bus;
   a receive buffer, said receive buffer connecting said serial input terminal to the data bus;
   a logic circuit connected to control said parallel data buffer, said transmit buffer and said receive buffer, said logic circuit including means for controlling said transmit and receive buffers in accordance with each of a plurality of communication modes, said plurality of modes including:
   i. a first receive mode in which said device receives serial data on said input terminal and transmits said received data via said output terminal;
   ii. a first transmit mode in which said device transmits serial data via said output terminal, receives on said input terminal an echoed transmission of said transmitted data, and compares said received transmission with said transmitted data;
   iii. a second receive mode in which said device receives serial data on said input terminal without transmitting said received data via said output terminal; and
   iv. a second transmit mode in which said device transmits data via said output terminal without receiving an echoed transmission of said transmitted data; and
   mode selection means, accessible by said logic circuit, for selecting one of said plurality of communication modes, said device operating in accordance with said selected one of said modes.

2. The integrated circuit interface device of claim 1 wherein said transmit buffer comprises a transmit buffer-latch circuit, and further comprising a transmit shift register coupled to said transmit buffer-latch for directing serial signals from said transmit buffer-latch to said serial output terminal under the control of said logic circuit.

3. The integrated circuit interface device of claim 2 wherein said receive buffer comprises a receive buffer-latch circuit, and further comprising a receive shift register coupled to said receive buffer-latch for directing serial signals from said serial input terminal to said receive buffer-latch.

4. The integrated circuit interface device of claim 3 further comprising a multiplex circuit, said multiplex circuit connecting said transmit shift register to said serial output terminal, and a comparison circuit for comparing the output of said transmit shift register, on a bit-by-bit basis, with signals received at said serial input terminal.

5. The integrated circuit interface device of claim 4 further comprising means responsive to the absence of a comparison by said comparison circuit for applying an error pulse to said multiplex circuit for transmission via said serial output terminal.

6. The integrated circuit interface device of claim 5 further comprising means for applying signal bits received serially at said input terminal to said multiplex circuit for transmission via said output terminal.

7. The integrated circuit interface device of claim 1, wherein said device operates in accordance with the Echoplex protocol in said first receive mode and in said first transmit mode.

8. The integrated circuit interface device of claim 7, wherein said device operates in accordance with the RS 232 protocol in said second receive mode and in said second transmit mode.

9. The integrated circuit interface device of claim 8, wherein said mode selection means comprises a programmable data register accessible by said logic circuit.

* * * * *